United States Patent
Behne

(10) Patent No.: US 11,630,818 B2
(45) Date of Patent: Apr. 18, 2023

(54) ITERATIVE PERFORMANCE ANALYSIS WITH INTERVAL EXPANSION

(71) Applicant: BMC Software, Inc., Houston, TX (US)

(72) Inventor: Michael D. Behne, Fulshear, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 17/304,015

(22) Filed: Jun. 11, 2021

(65) Prior Publication Data

US 2022/0398238 A1 Dec. 15, 2022

(51) Int. Cl.
*G06F 16/23* (2019.01)
*G06F 16/22* (2019.01)
*G06F 16/28* (2019.01)

(52) U.S. Cl.
CPC ...... *G06F 16/2358* (2019.01); *G06F 16/2272* (2019.01); *G06F 16/288* (2019.01)

(58) Field of Classification Search
CPC . G06F 16/2358; G06F 16/2272; G06F 16/288
See application file for complete search history.

(56) References Cited

U.S. PATENT DOCUMENTS

| | | | |
|---|---|---|---|
| 11,297,123 B1* | 4/2022 | Coombs | G06F 16/24568 |
| 2014/0279977 A1* | 9/2014 | Milousheff | G06F 16/219 707/695 |
| 2016/0092484 A1* | 3/2016 | Finkler | G06F 16/258 707/715 |
| 2016/0162506 A1* | 6/2016 | Li | G06F 16/24558 707/769 |
| 2016/0337366 A1* | 11/2016 | Wright | G06F 16/2358 |
| 2017/0364563 A1* | 12/2017 | Gao | G06F 16/288 |
| 2018/0089258 A1* | 3/2018 | Bhattacharjee | G06F 16/24535 |
| 2019/0057133 A1* | 2/2019 | Chainani | G06F 16/221 |
| 2020/0402058 A1* | 12/2020 | Zhou | G06Q 20/40145 |

\* cited by examiner

*Primary Examiner* — James Trujillo
*Assistant Examiner* — Michal Bogacki
(74) *Attorney, Agent, or Firm* — Brake Hughes Bellermann LLP

(57) ABSTRACT

Performance data characterizing operations of an application may be collected by time interval, and a plurality of keys may be associated with each element of the performance data. A first time interval may be received. An iterative group-and-filter search may be executed against the keyed elements within the first time interval, each iteration including an iteration key used to perform a key-based grouping operation followed by a group-based filter operation, wherein each iteration key is added to a composite key at each iteration. A selection of at least one keyed element within the first time interval and obtained from the iterative group-and-filter search may be received. A second time interval that precedes the first time interval may be received, and the keyed elements may be filtered using the composite key and within the second time interval to return the at least one keyed element within the second time interval.

20 Claims, 13 Drawing Sheets

Time intervals

Time Intervals

Time Intervals

Time Intervals

Time Intervals

Time Intervals

```
ASQEWAM1 / I              SQL Workload Analysis Menu                    09:25:28
Command ====> _____

Report criteria:
  Source of data      . . . : Subsystem C1AJ
  For Db2 SSIDs       . . . : X
  Start time          . . . : [04/23/2021 00:00:00]
  Duration            . . . : No time limit                     Mode:
  Initial report      . . . : LOGICAL Db2 ANALYSIS (DATA)       Advanced
  Application profile . . . : DEFAULT            Owner:
  Workload focus      . . . : SORT BY ELAPSED    Qualified: N   By text:  N Select one of the following options.

1  1. Workload analysis        - Begin workload reporting
    2. Initial report           - Select the initial report and mode
    3. Report type              - Select the report type (data or graph)
    4. Application profile      - Select the profile for group reporting
    5. Time interval            - Specify the time frame for reporting
    6. Data source, DB2(s)      - Select data source and Db2 subsystems
    7. Workload focus           - Specify options for faster report access
```

1206 → Start time field
1202 → Report criteria
1204 → Options list

FIG. 12

```
ASQEQRPW/I              View a Report                LINE 1 of 18
Command ====>_____ Scroll ===> CSR_

BMCSftur. SQMCACIL  --  LOGICAL Db2 ANALYSIS (DATA)  --  0/23 09:33:37
Source : C1AJ-ACTIVE  Intvl : 04/23 00.00 - UNLIMITED  More:
-------------------------------------------------------------------------------
Zooms:   G-AppGrp  I-ClntID  B-Connly  E-Error  F-HiEla   O-Object  J-reqLoc
         Y-Accel   N-ClntAp  W-ClntWS  L-Corr   X-Exptn   K-InpQul [P-Plan]  S-Stmt
         M-AccMtxg-ClntCT  C-ConnID  I-Detl  H-HiCPU V-Intvl  R-Prog  U-User
Expands: A-AvHilo  D-db2  Z-zIIP  1-More  z-Accel
                       Plan :         Preg:
Logical Data  SQL --------  Total  IN-SQL  Time ------+ +- SynclOs -+  Roll- %Elapsed
Db2 Name Sharing Calls Elapsed  %CPU   % Getpages Total GP/SIOCommits Backs I/O Lock Errors Ecptns
-------- --- ------- --- -------- ------- --- -------- ------- ------- --- ---- ---- ----- ------
P DEJM      N  3959K 88:12.83884 39 83:09.92847 43 17165766786288  21.8 34035 125 28.2 0.0  778  778
+ DSNDMC    Y 67894 83:30.82483 17 80:05.64924  1    224962   5740  39.2 13412   5  0.0 0.0   36   36
+ DEJI      N 3066K 02:42.15464 13 81:28.43765 28  3939921   9868 399.3 18529   9  1.7 0.0   61   61
+ DEHE      N 2637K 01:29.55670  7 81:05.80228 15  4156764  25968 160.1 14703   0  7.0 0.0    8    8
+ DEHJ      N 825152 01:25.73771  7 80:35.35847  8  1978212   6671 296.5 21716   0  4.2 0.0  798  798
+ DSNDLY    Y 198851 01:09.59870  6 80:11.28568  3  1618114  11883 137.1   232   5  5.9 1.1   11   11
+ DEBA      N 1788K 00:50.31920  4 80:18.55123  4   921631  14388  64.1   205   3  5.9 0.1  237  237
+ DEKS      N 189177 00:38.12255  3 80:09.55566  2  1449689   4234 342.4 11321  90  2.8 0.0  669  669
+ DSNDJQ    Y   5705 00:21.43424  2 80.01.12831  0    35294   1770  19.9   644   1  2.1 0.0    3    3
+ DSNDJY    Y 153348 00:18.98241  2 80:05.33134  1   238461  43384   5.3    31   0 58.7 0.0   55   55
+ DEEG      N  34863 00:04.19292  0 80:02.18860  0   121785    788 154.5  1138   1 10.5 0.0   39   39
+ DEKU      N 202139 00:02.97485  0 80:02.85652  0   679455        3226485 126  19  0.0 0.0  482  482
F1=Help F2=Split F3=End F4=Sort A F5=Sort D F6=Zoom F7=Up F8=Down F9=Swap F10=Left F11=Right F12=Cancel
```

1308 → LINE 1 of 18
1302 → Zooms/Expands section
1306 → P DEJM highlighted row
1304 → data rows

FIG. 13

```
ASQEQRPW/I              View a Report                    LINE 1 of 67
Command ====> _____ Scroll ===> CSR_

BMCSftur. SQMCACIL  -- LOGICAL Db2 ANALYSIS (DATA) -- 04/23 09:35:51
Source : CIAJ-ACTIVE  Intvl : 04/23 00.00 - UNLIMITED  More:
-----------------------------------------------------------------------
   Zooms:   G-AppGrp  I-CIntID   8-Comnly  8-DsGrp  X-Excptn  O-Object  S-Stmt
   Y-Accel  N-CIntAp  W-CIntWS  L-Corr   T-Detl   K-ImpQul [R-Prog] U-User
   M-AccMtx 9-CIntCT  C-ConnID  D-Db2   E-Error  V-Intvl   JReqLoc
   Expands: A-AvHiLo          Z-zIIP  1-More  2-Accel
   Db2:    D5Grp: DEJM                Preg:
           SQL     +------ Total IN-SQL Time ------+    +- SyncIOs -+   Roll-  %Elapsed
   Plan    Calls   Elapsed    %  CPU     % Getpages  Total  GP/SIO Commits Backs I/O Lock Errors Xcptns
   ------- ------  ---------  -- ------- -- -------- ------ ------ ------- ----- --- ---- ------ ------
 [P ACT1211M] 1677K 01:39.67846 18 01:05.18724 33 5587915 15889 353.5  7758   3  3.6 0.0  203  203
  + ACTC1SDM  1685K 01:26.63358 16 01:03.28575 32 5491030 12688 432.8  7784   0  2.6 0.0  202  202
  + DSNTEP2   19378 02:28.33999 27 88:20.13088 10 2283686 583755  4.4   341   0 57.3 0.0   74   74
  + CMD128A   41111 00:58.80528 11 88:12.63576  6 2339439 42483 55.2  3385   0 12.6 0.0    0    0
  + UURGC1PL  18973 00:28.28787  5 88:06.46062  6  585631 55578 10.5  2782   0 36.7 0.0    0    0
  + ALPBYML   47140 01:03.41179 12 00:03.37793  3  594816 182518  3.3   780   0 50.6 0.0    0    0
  + ACMCBQDA  50903 00:07.67085  1 00:02.34214  2  430932 13223 32.6   470   0 30.3 0.0    0    0
  + GUDC15DM  88068 00:03.69423  1 00:01.89268  1  126302  1172 107.8    4   0  7.1 0.1    0    0
  + NGT1211   19865 00:03.49859  1 00:01.94255  1  180049  1590 62.9  2780   0 21.6 0.0    0    0
  + ACNCBQXM   1828 00:04.53695  1 00:01.66158  1  268688 16591 15.7   223   0 48.2 0.0    0    0
  + DSNREXX   43328 00:04.46615  1 00:01.51528  1   69658   736 94.6   388   0  3.9 0.0    0    0
  + ASUC2DDS  31471 00:02.14811  0 00:01.12114  1  129542   811 159.7 1029   0 15.2 0.1    0    0
 F1=Help  F2=Split F3=End F4=Sort A F5=Sort D F6=Zoom F7=Up F8=Down F9=Swap F10=Left F11=Right F12=Cancel
```

FIG. 14

```
ASQEQRPW/I              View a Report                    LINE 1 of 36
Command ====> _____ Scroll ===> CSR_

BMC5ftwr. SQMCACTR  -- PROGRAM ANALYSIS (DATA)  -- 04/23 09:38:54
Source : CIAJ-ACTIVE  Intvl : 04/23 00.00 - UNLIMITED  More:
-----------------------------------------------------------------------
   Zooms:   G-AppGrp  9-CIntCT  C- ConnID  D-Db2   E-Error  V-Intvl  J-Reqloc
   Y-Accel  Q-CatSQL  I-CIntID  8-Connly   B-DsGrp X-Excptn O-Object S-Stmt
   M-AccMtx N-CIntAp  W-CIntW5  L-Corr     T-Detl  K-ImpQul P-Plan  [U-User]
   Expands: A-AvHiLo  F-Full    H-Hdr      2-zIIP  1-More   2-Accel
   Db2:    D5Grp: DEJM      Plan: ACT1211M  Preg:
           Switch  SQL      +----- Total IN-SQL Time -----+   +- SyncIOs -+   Roll-  %Elapsed
   Program Type  Count Calls  Elapsed    % CPU    % GetpagesTotal GP/SIO Commits backs I/O Lock Errors Xcptns
   ------- ---- ----- -----   ---------- --------- -- -------- ----- ------ ------- ----- --- ---- ------ ------
 [PACSGSQL]PKGE148239391115 00:26.46180 26 00:15.97135 25 1802860 13180 136.8 3597   0 10.6 0.0 202 202
  +ACSNQSP PKGE 73527 1100K 80:22.92916 23 00:15.94417 24 286389   31 6657.7 2953   0  0.0 0.0   0   0
  +ACSNQTT PKGE    34    66 00:18.41691 18 80:14.99978 23 1864277    4466069     8   0  8.0 0.1   0   0
  +ACSNQTMPKGE    24    64 00:16.61801 17 80:12.04137 18 1491393    2745697     4   0  8.0 0.1   0   0
  +AUBSQL  PKGE   154 23226 00:04.41366  4 80:80.65398  1     24   14   1.7     8   0  8.0 0.0   0   0
  +ACSNQCMPKGE   2736 14790 00:03.94170  1 80:00.91569  1  45384 1866  24.3   789   0 14.2 0.0   1   1
  +ACSGQNXPKGE 72862120094 00:03.55580  4 00:02.68721  4  38982   14 2784.4  282   0  8.1 0.0   0   0
  +ACTALSL PKGE   287   303 00:02.37211  2 80:80.91792  1 116487  398 298.5     3   1  3.1 0.0   0   0
  +ACSNQDSPKGE    798  1856 00:08.42673  0 80:80.32588  0   7285    9 880.6    68   0  8.5 0.1   0   0
  +ACSNQUSPKGE    182   248 80:08.23585  0 80:80.19358  0   4597    3 1532.3   12   0  8.6 0.0   0   0
  +DSNADMIZSTPR    64 22720 00:08.19375  0 80:80.16136  0    632    1 632.0     0   0  8.1 0.0   0   0
  +ACSNSTA PKGE    72   192 00:08.11229  0 00:00.09491  0   2564    2 1282.0   16   0  8.7 0.0   0   0
 F1=Help  F2=Split F3=End F4=Sort A F5=Sort D F6=Zoom F7=Up F8=Down F9=Swap F10=Left F11=Right F12=Cancel
```

FIG. 15

```
ASQEQRPW/I              View a Report              LINE 1 of 358
Command ====>_____ Scroll ===> CSR_

BMCSftwr. SQMCACTX--SQL STATEMENT ANALYSIS (DATA) -- 04/23 09:47:44
Source : CIAJ-ACTIVE Intvl : 04/23 00.00 - UNLIMITED      More:
-----------------------------------------------------------------
 Zooms:   Q-CatSQL  I-ClntID   B-Connly B-DsGrp  X-Excptn O-Object  J-ReqLoc
 M-AccMtx N-ClntAp  W-ClntWS   L-Corr   T-Detl   K-ImpQul P-Plan   [S-SQLtxt]
 G-AppGrp g-ClntCT  C-ConnID   D-Db2    E-Error  V-Intvl  R-Recmnd U-Usre
 Expands: A-AvHiLo  F-Full     H-Hdr    Z-Times  1-More   2-Accel   3-Text
 Db2:        DsGrp: DEJM       Plan: ACT1211M
     CorrID: CMJMDY18       ConnID: IDA:       InpQul:
     AppGrp:                User:I0A    IN-SQL:
         Dyn/Stat  Sect Stnt   SQL    +----- Total IN-SQLTime -----+  Get-   +- SynclOs-+ +- %Elapsed -+Avg
 Program Stmt Type No.  No.    Calls  Elapsed      % CPU              Pages  Total GP/SIO I/O Lock Nest Tasks Errs Xcpts Accl
 ------- --------- ---- ----   -----  -------    --- ---              -----  ----- ------ --- ---- ---- ----- ---- ----- ----
gACSGSQLD CURSOR   5   712      18 00:01.34849 10 00:88.22094  3  75598   65 1163  8.9 0.0 0.0    0    0    0 N
+ACSGSQLD CURSOR   5   712   33250 00:01.29109 10 00:88.82171 10  42633 1532 27.8 22.5 0.0 0.0    0    0    0 N
+ACSGSQLD CURSOR   1   577     866 00:81.18145  9 00:88.90526 11 292332  259 1129  3.9 0.0 0.0    0    0    0 N
+ACSGSQLD CURSOR   8   844     315 00:80.56736  4 00:88.45252  5 130697   76 1720  2.0 0.0 0.0    0    0    0 N
+ACSGSQLD CURSOR   1   577    5980 00:00.38523  3 00:88.30159  4   5713   12 476.1 0.0 0.0 0.0    0    0    0 N
+ACSGSQLD CURSOR   5   712     178 00:80.35189  3 00:88.24282  3  69656  316 228.4 13.9 0.0 0.0   0    0    0 N
+ACSGSQLD CURSOR   1   577    2948 00:80.32908  2 00:88.23655  3   4819    6 883.2 0.6 0.0 0.0    0    0    0 N
+ACSGSQLD CURSOR   1   577    4695 00:80.24967  2 00:88.17567  2   4581   12 375.1 1.0 0.0 0.0    0    0    0 N
+ACSGSQLD CURSOR   5   712    7435 00:80.24347  2 00:88.15788  2   2886   66 42.5 11.4 0.0 0.0    0    0    0 N
+ACSGSQLD CURSOR   1   577    3540 00:80.22806  2 00:00.16348  2   3628    3 1209 0.3 0.0 0.0     0    0    0 N
 F1=Help F2=Split F3=End F4=Sort A F5=Sort D F6=Zoom F7=Up F8=Down F9=Swap F10=Left F11=Right F12=Cancel
```

FIG. 18

```
ASQEQRPW/I                     View a Report                    LINE 1 of 16
Command ====>_____ Scroll ===> CSR_
BMCSftwr. SQMCACTY       --    SQL  STATEMENT  TEXT     --      04//23 09:50:38
          Actions for +:  T-Detail     E-Errors     H-Header     O-Objects
                  for *:  X-Explain    SQL text
    Subsys:              CorrID: CMJMDY10         Plan: ACT1211M  ClntAp:
    ConnID:              User :  TOA              SectNo:     5   ClntID:
    AppGrp:                                                       ClntWS:
                         Stmt      +---------- SQL ----------+  +- Total IN-SQL Time -+
   Program               No.       Calls  Open   Fetch  Errs    Elapsed      CPU              Getpages
   ----------            ----      -----  ----   -----  ----    --------     ---              --------
   ACSGSQL               712         10     2      4     0      00:01.34849  00:00.22094       75590
   Call Type: CURSOR                                    Averages: 00:00.13485  00:00.02209      7559
   Stmt Type: DYNAMIC                            +-------------------------------------------------

Dynamic SQL Statement text:
       SELECT     B. TYPE, A.*
       FROM       "SYSTEM". "SYSTABAUTH" A, "SYSTABLES" B
       WHERE      A. SCREATOR = ?
         AND      A. STNAME = ?
         AND      B. CREATOR = A. TCREATOR
         AND      B. NAME = A. TTNAME
       ORDER      BY GRANTEDTS
       FOR        FETCH ONLY
```

FIG. 19

```
ASQEQRPW/I              View a Report              LINE 1 of 358
Command ====>_____ Scroll ===> CSR_

BMCSftwr. SQMCACTX--SQL STATEMENT ANALYSIS (DATA) --04/23 09:56:39
Source : CIAJ-ACTIVE  Intvl : 04/23 00.00 - UNLIMITED       More:
------------------------------------------------------------------------------
    Zooms:   Q-CatSQL  I-ClntID  B-Connly B-DsGrp  X-Excptn O-Object J-ReqLoc
    M-AccMtx N-ClntAp  W-ClntWS L-Corr    T-Detl   K-ImpQul P-Plan   S-SQLtxt
    G-AppGrp g-ClntCT  C-ConnID D-Db2     E-Error  [V-Intvl] R-RecmndU-Usre
    Expands: A-AvHiLo  F-Full    H-Hdr    Z-Times  1-More  2-Accel  3-Text
      Db2:    DsGrp: DEJM     Plan: ACT1211M                       ─2002
      CorrID: CMJMDY18   ConnID: IDA:     InpQul:
      AppGrp:            User:IOA  IN-SQL:
           Dyn/Stat Sect Stnt  SQL +----- Total IN-SQLTime -----+ Get-   +- SyncIOs-+ +- %Elapsed -+Avg
  Program  Stmt Type No.  No.  Calls  Elapsed       % CPU          Pages  Total GP/SIO I/O Lock Nest Tasks Errs Xcpts Accl
  --------  --------- ---- ---- ------ ----------- - ---------- ------ ----- ------ --- --- --- ---- ---- ---- ----
  gACSGSQLD CURSOR  5   712       18 00:01.34849 10 00:88.22094  3  75598    65 1163   8.9 0.0 0.0   0    0    0 N
  +ACSGSQLD CURSOR  5   712    33250 00:01.29109 10 00:88.82171 10  42633  1532  27.8  22.5 0.0 0.0   0    0    0 N
  +ACSGSQLD CURSOR  1   577      866 00:81.18145  9 00:88.90526 11 292332   259 1129   3.9 0.0 0.0   0    0    0 N
  +ACSGSQLD CURSOR  8   844      315 00:80.56736  4 00:88.45252  5 130697    76 1720   2.0 0.0 0.0   0    0    0 N
  +ACSGSQLD CURSOR  1   577     5980 00:00.38523  3 00:88.30159  4   5713    12 476.1  0.0 0.0 0.0   0    0    0 N
  +ACSGSQLD CURSOR  5   712      178 00:80.35189  3 00:88.24282  3  69656   316 228.4 13.9 0.0 0.0   0    0    0 N
  +ACSGSQLD CURSOR  1   577     2948 00:80.32908  2 00:88.23655  3   4819     6 883.2  0.6 0.0 0.0   0    0    0 N
  +ACSGSQLD CURSOR  1   577     4695 00:80.24967  2 00:88.17567  2   4581    12 375.1  1.0 0.0 0.0   0    0    0 N
  +ACSGSQLD CURSOR  5   712     7435 00:80.24347  2 00:88.15788  2   2886    66  42.5 11.4 0.0 0.0   0    0    0 N
  +ACSGSQLD CURSOR  1   577     3540 00:80.22806  2 00:00.16348  2   3628     3 1209   0.3 0.0 0.0   0    0    0 N
  F1=Help  F2=Split  F3=End  F4=Sort A  F5=Sort D  F6=Zoom  F7=Up  F8=Down  F9=Swap  F10=Left  F11=Right  F12=Cancel
```

FIG. 20

```
                          ,2104
ASQEQRPW/I              (    View a Report            [LINE 1 of 1]
Command ====>[Trend 30 archives]_____ Scroll ===> CSR_

BMC5ftwr. SQMCACTU  --  PROGRAM ANALYSIS (DATA)  --      04/23 09:42:26
Source : CIAJ-ACTIVE  Intvl : 04/23 00.00 - UNLIMITED
------------------------------------------------------------------------------
   Zooms:  G-AppGrp I-ClntID  B-Connly T-Dell   K-ImpOut P-Plan  S-Stmt
           Y-Accel  N-ClntAp W-ClntWS L-Corr    E-Error  Y-Intvl R-Prog U-User
   M-AccMtx g-ClntCT C-ConnID D-Db2    X-Excptn O-Object J-ReqLoc
   Expands: A-AvHiLo Z-zIIP    1-More   1-More   2-Accel
   Db2:     DsGrp: DEJM   Plan: ACT1211M  Preg: AC5GSQL
   CorrID: CMJMDY18   ConnID:         Stnt:       712
   AppGrp:            User: IDA:   ImpQul:
                  SQL+_____Total In-SQLTime -----+     +- Sync 10s -+   Roll- %Elapsed
   Workload Interval     Calls Elapsed    % CPU      % Getpages Total GP/SIOCommits backs I/O Lock Errors Xcptns
   --------------------- ----- ---------- -----      ---------- ----- ------ ------- ----- --- ---- ------ ------
 + 04/23/21 00:00:00-10:01:59  10 00:01.34849100 00:00.22894100    75590    65 1162.9    0     0 0.9 0.0    0     0

F1=Help  F2=Split  F3=End  F4=Sort A  F5=Sort D  F6=Zoom  F7=Up  F8=Down  F9=Swap  F10=Left  F11=Right  F12=Cancel
```

FIG. 21

```
ASQEQRPW/I           View a Report              LINE 1 of 22
Command ====>_____ Scroll ===> CSR_
BMC5ftwr. SQMCACIV-- INTERVAL ANALYSIS (DATA)--   04/23 10:56:01
   Db2:      DsGrp:DEJN    Plan:ACT1211NProg:ACSGSQL
    CorrID: CMJMDY10 ConnID:        Stmt:     712
    AppGrp:             User: IDA    ImpQul:
                  SQL  +----- Total In-SQLTime -----+    +- SyncIOs -+      Roll-  %ELapsed
 Workload Interval  Calls  Elapsed     % CPU       % Getpages Total GP/SIO Commits Backs I/O Lock Errors Xcptr
 04/23/21 00:00:00-10:01:59  10 00:01.34849  2 00:00.22894  3   75598    65 1162.9    0    0 0.9 0.0    0    0
 04/22/21 00:00:00-23:59:59  10 00:01.12193  2 00:00.21140  3   75590    65 1162.9    0    0 0.8 0.0    0    0
 04/21/21 00:00:00-23:59:59  10 00:01.16985  2 00:00.22154  3   75598    65 1162.9    0    0 1.2 0.0    0    0
 04/20/21 00:00:00-16:04:59  10 00:01.11318  2 00:00.21909  3   75591    66 1145.3    0    0 0.8 0.0    0    0
 04/16/21 00:00:00-07:27:59  10 00:01.23845  2 00:00.28245  3   75598    68 1111.6    0    0 0.8 0.0    0    0
 04/15/21 00:00:00-23:59:59  10 00:01.13786  2 00:00.21840  3   75598    66 1145.3    0    0 1.0 0.0    0    0
 04/14/21 00:00:00-23:59:59  10 00:01.21764  2 00:00.21484  3   75658    65 1164.8    0    0 0.8 0.0    0    0
 04/13/21 00:00:00-23:59:59  10 00:01.16760  2 00:00.22894  3   75658    64 1182.2    0    0 0.8 0.0    0    0
 04/12/21 00:00:00-23:59:59  10 00:01.21757  2 00:00.21893  3   75658    65 1164.8    0    0 0.8 0.0    0    0
 04/09/21 00:00:00-20:04:59  10 00:01.27592  2 00:00.21779  3   75658    66 1146.3    0    0 1.1 0.0    0    0
 04/08/21 00:00:00-23:59:59  10 00:01.14781  2 00:00.21417  3   75658    68 1112.6    0    0 0.9 0.0    0    0
 04/07/21 00:00:00-23:59:59  10 00:01.44169  2 00:00.38644  5   75658    68 1112.6    0    0 1.1 0.0    0    0
 04/06/21 00:00:00-23:59:59  10 00:01.79195  4 00:00.35458  5   75658    66 1146.3    0    0 0.6 0.0    0    0
 04/05/21 00:00:00-08:49:59  10 00:01.25490  2 00:00.38236  5   75658    67 1129.2    0    0 1.1 0.0    0    0
 04/02/21 00:00:00-23:59:59  10 00:01.21822  3 00:00.35927  5   75658    65 1164.8    0    0 1.3 0.0    0    0
 04/01/21 00:00:00-13:24:59  10 00:01.77888  2 00:00.35404  5   75658    66 1146.3    0    0 0.9 0.0    0    0
 03/31/21 00:00:00-23:59:59  10 00:01.13676  6 00:00.37498  6   75658    64 1182.2    0    0 0.5 0.0    0    0
 03/30/21 00:00:00-23:59:59  10 00:01.89781  3 00:00.33137  5   75658    64 1182.2    0    0 0.5 0.0    0    0
 03/29/21 00:00:00-23:59:59  10 00:01.60212  2 00:00.31425  5   75658    65 1164.0    0    0 0.6 0.0    0    0
```

FIG. 22

```
ASQEQRPW/I           View a Report              LINE 1 of 25
Command ====>_____ Scroll ===> CSR_
BMC5ftwr. SQMCACIV-- INTERVAL ANALYSIS (DATA)--   04/27 11:12:53
   Db2:      DsGrp:DEJN    Plan:ACT1211NProg:ACSGSQL
    CorrID: CMJMDY10 ConnID:        Stmt:     53
    AppGrp:             User: IDA    ImpQul:
                  SQL  +------Total IN-SQL Time -----+    +- SyncIOs -+      Roll - %Elapsed
 Workload Interval  Calls Elapsed      % CPU         % GetpagesTotal GP/SIOCommitsBacks I/O Lock Errors Xcptn
 + 03/03/21 13:00:00-13:59:59 1166 20:55.88219 95 01:12.72202 91 5841116718447 3166.4  0   0 8.4 8.8    0    0
                      Averages:  00:01.87709    00:00.86237      58095    16
                      Highs:     00:27.34691  88 00:52.88000    288838    64
                      Lows:      00:00.00001    00:00.00001          0     8
                 +----------------------------------------------------------------+
 + 03/02/21 13:00:00-13:59:59 3803500:23.74442 95 00:02.69798 3   33116 19167  1.7    0   0 87.4 8.8    0    0
                      Averages:  00:00.00062    00:00.00007          1     1
                      Highs:     00:02.82797    00:00.00246          5     3
                      Lows:      00:00.00001    00:00.00000          0     0
                 +----------------------------------------------------------------+
 + 03/01/21 13:00:00-13:59:59 1758 00:00.73298 95 00:02.13841 8    1532 19167  1.7    0   0 82.2 8.8    0    0
                      Averages:  00:00.00042    00:00.00007          1     1
                      Highs:     00:02.85876    00:00.00055          5     3
                      Lows:      00:00.00008    00:00.00000          0     0
                 +----------------------------------------------------------------+
 + 02/28/21 13:00:80-13:59:59 3979800:25.41523  2 00:02.71967 3   34801 20067  1.7    0   0 83.4 8.8    0    0
                      Averages:  00:00.80864    00:00.00007          1     1
                      Highs:     00:01.12980    00:00.00245          5     3
                      Lows:      00:00.00000    00:00.00000          0     0
```

FIG. 23

ITERATIVE PERFORMANCE ANALYSIS WITH INTERVAL EXPANSION

TECHNICAL FIELD

This description relates to resource performance analysis.

BACKGROUND

It is common practice to provide huge quantities of computing resources and capabilities to large numbers of users. For example, a mainframe platform environment may provide computing services or a cloud provider may provide cloud-based resources to millions of users simultaneously. In these and other contexts, users expect defined levels of service and performance from the provided computing resources, and administrators are responsible for ensuring that such levels are met without interruption.

In many scenarios, however, difficulties arise with respect to providing the defined levels of service and performance expected by users. For example, an administrator may make an error, such as an error in defining how virtual memory is allocated among users. In other examples, users may make an error in the use of their assigned resources, such as attempting to execute an ill-formed query.

Given the volume of provided computing resources and the number of users of such resources, it is difficult and time-consuming to identify and correct such errors, or other system malfunctions expeditiously. As a result, system administrators may be inefficient, and users may not receive expected levels of service and performance when they need it.

SUMMARY

According to one general aspect, a computer program product may be tangibly embodied on a non-transitory computer-readable storage medium and may include instructions. When executed by at least one computing device, the instructions may be configured to cause the at least one computing device to collect, by time interval, performance data characterizing operations of an application of an operating system environment, and associate a plurality of keys with each element of the performance data, to obtain keyed elements. When executed by at least one computing device, the instructions may be configured to cause the at least one computing device to receive a first time interval, and execute an iterative group-and-filter search against the keyed elements within the first time interval, each iteration of the iterative group-and-filter search including an iteration key used to perform a key-based grouping operation followed by a group-based filter operation, wherein each iteration key is added to a composite key at each iteration. When executed by at least one computing device, the instructions may be configured to cause the at least one computing device to receive a selection of at least one keyed element within the first time interval, obtained from the iterative group-and-filter search, receive a second time interval that precedes the first time interval, and filter the keyed elements using the composite key and within the second time interval to return the at least one keyed element within the second time interval.

According to another general aspect, a computer-implemented method includes collecting, by time interval, performance data characterizing operations of an application of an operating system environment, and associating a plurality of keys with each element of the performance data, to obtain keyed elements. The method includes receiving a first time interval, and executing an iterative group-and-filter search against the keyed elements within the first time interval, each iteration of the iterative group-and-filter search including an iteration key used to perform a key-based grouping operation followed by a group-based filter operation, wherein each iteration key is added to a composite key at each iteration. The method includes receiving a selection of at least one keyed element within the first time interval, obtained from the iterative group-and-filter search, receiving a second time interval that precedes the first time interval, and filtering the keyed elements using the composite key and within the second time interval to return the at least one keyed element within the second time interval.

According to another general aspect, a system may include at least one memory including instructions, and at least one processor that is operably coupled to the at least one memory and that is arranged and configured to execute instructions that, when executed, cause the at least one processor to collect, by time interval, performance data characterizing operations of an application of an operating system environment, and associate a plurality of keys with each element of the performance data, to obtain keyed elements. When executed by at least one processor, the instructions may be configured to cause the at least one processor to receive a first time interval, and execute an iterative group-and-filter search against the keyed elements within the first time interval, each iteration of the iterative group-and-filter search including an iteration key used to perform a key-based grouping operation followed by a group-based filter operation, wherein each iteration key is added to a composite key at each iteration. When executed by at least one processor, the instructions may be configured to cause the at least one processor to receive a selection of at least one keyed element within the first time interval, obtained from the iterative group-and-filter search, receive a second time interval that precedes the first time interval, and filter the keyed elements using the composite key and within the second time interval to return the at least one keyed element within the second time interval.

The details of one or more implementations are set forth in the accompanying drawings and the description below. Other features will be apparent from the description and drawings, and from the claims.

BRIEF DESCRIPTION OF THE DRAWINGS

FIGS. 12-23 are screenshots illustrating an example implementation of the performance analysis system of FIG. 1, using the methods of the flowcharts of FIGS. 2 and 11.

DETAILED DESCRIPTION

Figure 1:
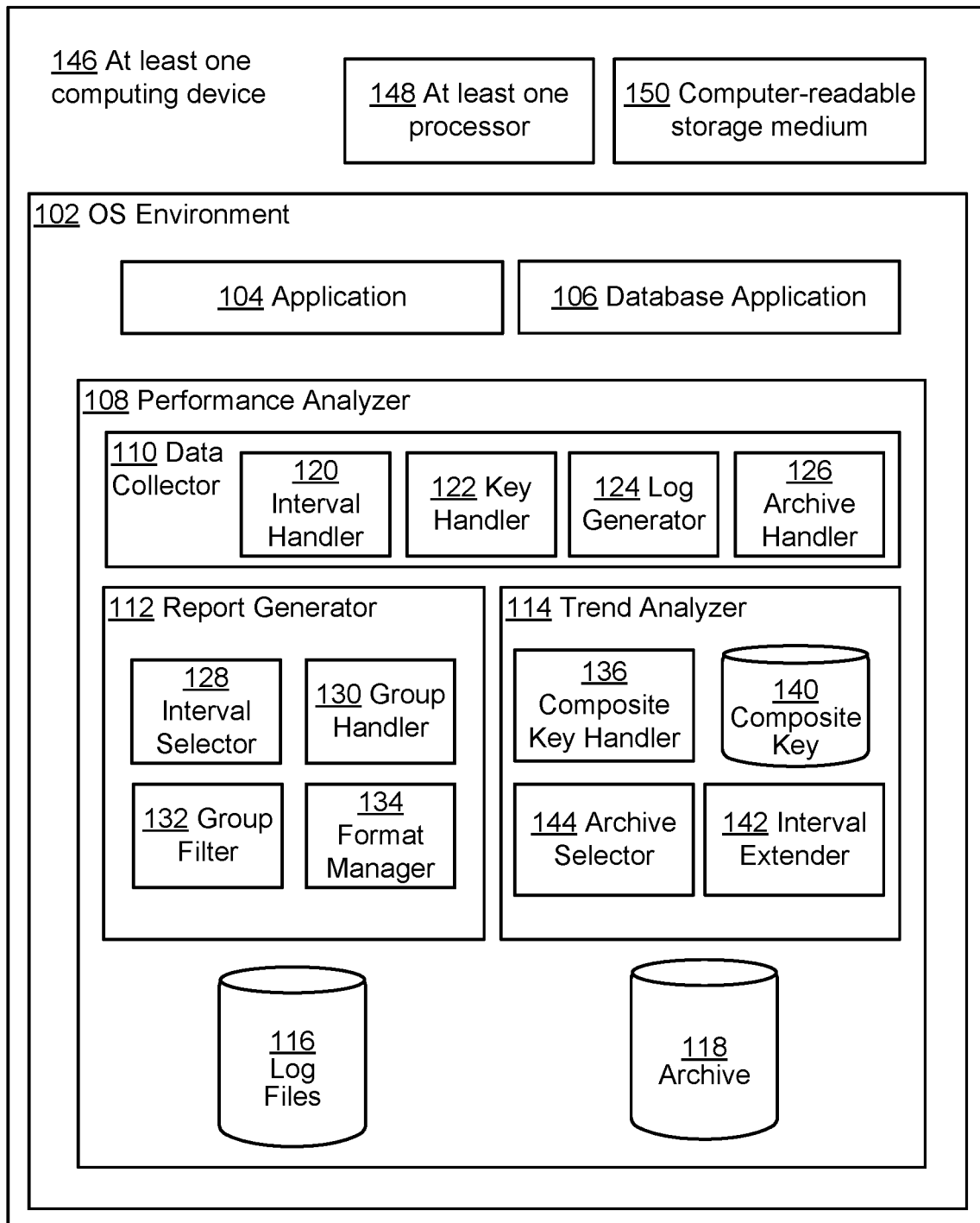
FIG. 1 is a block diagram of a performance analysis system with interval expansion.

Described systems and techniques provide performance analysis within and across defined time intervals. System administrators and other users are provided with an ability to identify and inspect trends and patterns with respect to resource usage and other factors that may lead to system malfunction or underperformance.

For example, a user may be provided with an ability to perform an iterative group-and-filter search operation, to thereby zoom in on desired performance data within a time interval. Such searching is frequently useful when an identified problem is occurring or has recently occurred.

In this way, a user may identify performance data within a selected time interval that is thought to be a cause of, or contributor to, a system malfunction or underperformance. However, such identified performance data may or may not represent an actual cause of the problem being experienced.

To discern whether an identified performance data is actually problematic, described techniques enable interval extension or expansion over a second-time interval (which includes and precedes the first-time interval), in a manner that is efficient, fast, and straightforward for a user, and that does not consume excessive system resources. For example, if a user determines that a particular CPU consumption appears to be excessive within the last hour, the user may easily extend the relevant performance data to preceding hours. In this way, for example, the user may discern whether the CPU consumption in the last hour is an anomaly or a normal operation.

To make such determinations for the types of iterative group-and-filter search techniques described herein, it is possible in some implementations to simply repeat the grouping operations and filtering operations of each iteration, but in a second-time interval. Such an approach may be performed manually or automatically. In either case, such an approach may require extensive amounts of data processing, which may be time and resource intensive. When done manually, a user may be required to remember, and re-apply, search parameters and values over a potentially large number of iterations.

Moreover, when inspected over an extended time interval, an identified performance analysis element may be, in some instances, ruled out as a potential source of malfunction or underperformance. In such cases, it may be necessary to repeat an extension process for another performance analysis element(s), until the source of the problem is found. To the extent that techniques for extending a time interval are repeated across different performance analysis elements, such repetitions only compound the quantity of undesired data processing increasing the use of resources and possibly impacting or hindering further performance of the system.

In contrast, using the techniques described herein, it is possible to extend a time interval for a performance analysis element being inspected, in a manner that is straightforward and intuitive, and that conserves computing resources while providing desired results quickly. As a result, a user may identify one or more potential or suspicious performance analysis elements within a first time interval using a group-and-filter search, and then quickly extend each discovered performance analysis element to a desired time interval. Consequently, the described techniques enable faster and more accurate identification of sources of malfunction or underperformance within a computing system using much less resources and with less impact on further performance.

FIG. 1 is a block diagram of a performance analysis system with interval expansion. In the example of FIG. 1, an operating system environment (OS environment) 102 is illustrated as being used to execute an application 104, which may represent many different types of applications running on the OS environment 102, including, e.g., a database application 106.

The OS environment 102 may provide, for example, a stable and secure environment for the applications 104, 106, or any application running in the OS environment 102. For example, the OS environment 102 may use logical address spaces to ensure isolation of resources among many different users, process large numbers of parallel batch processes, maintain data integrity and security, manage many input/output (I/O) configurations, and enable remote monitoring and administration. As a result, the OS environment 102 may provide applications 104, 106, or any application running in the OS environment 102 to many different users, running many different jobs or workloads.

In example implementations, the OS environment 102 may include the z/OS environment from IBM. In other examples, the OS environment 102 may include a Linux or Windows environment, and other operating systems and implementations may be used, as well.

The OS environment 102 may execute on at least one computing device 146, which may include at least one processor 148 and a computer-readable storage medium 150, among various other types of hardware. For example, the at least one computing device 146 may represent a mainframe computer that is accessed and shared by many different users and administered by various administrative personnel. Additionally, or alternatively, the at least one computing device 146 may represent one or more server computers, e.g., cloud servers, that may be accessed by many different authorized users.

The OS environment 102 provides mediation between the hardware of the at least one computing device 146, including the at least one processor 148 and the computer readable storage medium 150, and the various applications 104, 106, or any application running in the OS environment 102. For example, the OS environment 102 may be configured to facilitate operations of the applications 104, 106, or any application running in the OS environment 102 with respect to reading or writing data to or from various registers or other memories, providing processor access, managing I/O devices, and providing the various other functions described herein or known in the art.

Application 104 and application 106 may thus represent any service, middleware, component, or other application that is able to be executed using the OS environment 102. In addition to database application 106, which may include or represent database servers/systems, application 104 may represent, for example, web servers, virtual machines, or transaction managers.

By way of more specific examples, it may occur that the at least one computing device 146 is used by an enterprise such as an airline, banking, or insurance enterprise that has millions of employees, customers, and/or business partners, with commensurate quantities of data being processed. For example, database application 106 may represent a database system, such as IBM's Db2 enterprise data server or database engine, which manages desired types and quantities of data (and associated data management and access functionality) on behalf of such customers. Specific examples, provided in the context of z/OS as the OS environment 102 and Db2 as the database application 106, are provided below, e.g., with respect to FIGS. 12-23.

In these and similar contexts, customers, administrators, and other users have implicit or explicit expectations regarding a level of service provided by applications 104, 106. Such expectations may be quantified with respect to, e.g., latency, processing times, or quantity of memory provided. Given that many different users and applications may be active at any time and may be sharing the underlying hardware and software resources of the at least one computing device 146, any malfunction or underperformance of such resources may have wide-ranging impacts.

For example, a user who poses an ill-formed query to a database may consume excessive CPU or memory resources. As a result, the same or other users may experience reductions in service levels. For example, there may be a chain reaction or domino effect in which the ill-formed query causes delays that lead to further delays within the system. Thus, due to the shared nature of system resources, a large quantity of data being processed, and the proliferating effects of an original error, it may be difficult for an administrator to identify the ill-formed query.

Additionally, the various processes executed by the applications 104, 106 may be long-running in nature. For example, a database may be constantly updated as new data becomes available, and some queries may run continuously against the data. Over their lifetimes, such long-running processes may experience normal or tolerable variations in system resource usage, but may also exceed acceptable thresholds. Such threshold violations may be absolute or may be relative to current usage levels of other users.

In order to analyze these and other aspects of a performance of applications 104, 106, in the context of an OS environment 102, a performance analyzer 108 may be configured to provide the types of group-and-filter search operations with interval expansion described herein. For example, as shown, performance analyzer 108 may include a data collector 110, a report generator 112, and a trend analyzer 114.

Data collector 110 may be configured to interface with applications 104, 106 and OS environment 102 to collect any specified performance data within a system. Data may be collected using any known techniques, including both push and/or pull techniques. Data collector 110 may store collected performance data for a period of time in log files 116 for fast, easy access and may move or copy the performance data to archive 118 after a specified quantity of time, or based on other criteria, as discussed below.

Data collector 110 is illustrated as including an interval handler 120, which is configured to enable an administrator to set and define intervals for which performance data is captured. For example, as referenced above, collected performance data may include large quantities of data that occurs, or is generated, on a continuous, intermittent, or periodic basis, e.g., as the applications 104, 106 execute their respective operations.

Attempting to collect such data continuously may be or become infeasible. For example, the resulting volume of data to be stored, indexed, and/or accessed may be excessive.

Moreover, collected performance data may be better represented and used on an interval basis. For example, collected data may be more useful when averaged over a defined interval. In other examples, a maximum, minimum, or median value within each interval may be of interest.

Therefore, interval handler 120 may be used to define periodic intervals, such as an interval of a defined number of seconds or minutes, for each type of performance data that is collected. When the same interval is defined across multiple types of performance data, the collected performance data may be thought of as discrete elements, each having a per-interval value. For example, performance data related to CPU consumption may be averaged across each interval and stored as elements having a single, average value for each interval. Thus, collected performance data may be referred to as performance data elements, performance analysis elements, or elements.

Each such element may implicitly or explicitly be associated with many different aspects of the OS environment 102, as well as with its associated application. For example, an element characterizing CPU consumption for an interval may be associated with a user, a user group, an application, an application group, a plan, and/or a program.

Accordingly, performance data collected by data collector 120 may be viewed at different levels, and/or with different groupings. For example, many users may run many queries, using multiple instances of database application 106. Then, a single query may be associated with a group of various users and/or instances, or many queries may be grouped as being run by a single user. As shown by these simple examples, it is thus possible to attempt to isolate whether a problem exists with a particular query being run by multiple users, or with a particular user who is running multiple problematic queries.

To enable and facilitate these and similar types of analyses, the data collector 110 includes a key handler 122. The key handler 122 may be configured to enable definition and use of a plurality of keys associated with each element and stored within log files 116. For example, a query statement implemented by a particular user in a particular implementation or instance of database application 106 may be associated with a user key and an application key and stored in log files 116.

A log generator 124 may be configured to associate all defined keys and associated key values with log files 116. For example, a user key may have key values indicating a particular user A, user B, or user C. Thus, as elements are stored in association with corresponding keys, the elements may be referred to as keyed elements.

Collected performance data may be logged in conjunction with operations for aggregating or otherwise processing data by interval. For example, a number of calls, a time elapsed, a number of pages retrieved from memory, and various other metrics may be tracked, and log generator 124 may pre-aggregate, accumulate, or otherwise process such data for fast retrieval during later search operations.

An archive handler 126 may be configured to manage data storage within archive 118, using data from log files 116. For example, archive 118 may be formatted in a manner that consumes less storage space, but is more time-consuming to access. Archive handler 126 may determine when it is appropriate to migrate data from log files 116 to archive 118, and when to delete data from log files 116 based on associated archive criteria. Archive handler 116 may be further configured to format migrated, archived data within archive 118. For example, archive 118 may be stored as sequential files.

Report generator 112 may be configured to generate reports and otherwise access and utilize data collected by data collector 110 and stored within log files 116 and archive 118. Report generator 112 may generate such reports using intervals and keys provided by data collector 110 and by executing the types of iterative group-and-filter search operations described herein.

For example, using an appropriate user interface, such as the graphical user interface (GUI) shown in the example screenshots of FIGS. 12-23, report generator 112 may display a selected interval, available keys to be used in the iterative group-and-filter search operations, and intermediate (e.g., at each iteration) and final displays of analyzed data.

Thus, in the example of FIG. 1, report generator 112 includes an interval selector 128, which may be configured to initiate a group-and-filter search within a search session, including receiving a user selection of an interval, or interval multiple, of the intervals defined by interval handler 120.

For example, a defined interval may be a 5-minute interval, and interval selector 128 may select a first-time interval defined as a most recent hour, or as the time elapsed since the start of a current business day.

Within the selected time interval, a group handler 130 may be configured to receive or determine a selection of a key-based group of performance data elements. For example, an administrator may initially group by key=user.

Group filter 132 enables filtering or removal of non-selected groups. That is, group filter 132 effectively provides filtering based on key values of the key used for grouping by the group handler 130. For example, if a selected key=user and data within a first time-interval is displayed as being grouped by user, then the group filter may receive a selection of a key value=User A, and may remove all data associated with all other users and/or groups.

Group handler 130 and the group filter 132 may then proceed with additional group-and-filter iterations, including grouping by key and filtering by key value at each iteration. Therefore, a key used at a given iteration may be referred to as an iteration key. When a final keyed element is reached that is or final keyed elements are reached that are suspected of contributing to performance problems, a format manager 134 may format and output a final report to the administrator or other user.

In many cases, as referenced above, it may not be possible to conclusively determine a root cause of a system malfunction or underperformance even when a single, final keyed element is identified by the above-described iterative group-and-filter search operations. For example, in the above example, the single, final keyed element is provided for the originally received time interval and may have an anomalous value (e.g., may indicate excessive CPU consumption). Nonetheless, such excessive CPU consumption may be a transient or unrelated effect and may not be causing the problem being investigated.

Trend analyzer 114 may be configured to extend the above-described iterative group-and-filter search operation to a second-time interval that precedes and includes the first-time interval of the original iterative group-and-filter search operation conducted by report manager 112. By viewing the identified performance data element over a longer interval, the administrator may more easily determine whether a determined value of the originally identified keyed element is anomalous or representative. Consequently, the administrator may more easily determine a root cause of a problem being experienced.

As more easily visualized and understood from the example operations of FIGS. 3-10, below, it may be possible for an administrator to simply repeat the original iterative group-and-filter search operation executed by report generator 112, without using trend analyzer 114. Such an approach would require the administrator to select an expanded time interval and then re-apply, in order, each of the keys and key values used in the original iterative group-and-filter search operation.

As a result, such an approach is labor and time-intensive and prone to error. Moreover, such an approach requires re-processing not only all of the performance data processed in the first iterative group-and-filter search operation, but also all performance data throughout the extended, second-time interval. Therefore, such an approach is an inefficient use of data processing resources. In FIG. 1, however, trend analyzer 114 is configured to track and monitor aspects of the original iterative group-and-filter search operation and is thus able to extend the performance analysis interval in a fast, efficient, and reliable manner.

For example, trend analyzer 114 is illustrated as including a composite key handler 136. Composite key handler 136 may be configured to track, build, and store a composite key 140 that includes all of the iteration keys and corresponding key values of the original iterative group-and-filter search operation.

The composite key handler 136 may be configured to generate a corresponding data structure for a composite key 140, such as a control block. Operations of composite key handler 136 may thus proceed in parallel with, and in conjunction with, operations of report generator 112. That is, at each iteration of an iterative group-and-filter search operation, composite key handler 136 may update the composite key 140, and store the updated composite key using a control block or other suitable data structure.

Then, once the original iterative group-and-filter search operation has been completed, the corresponding composite key may be re-applied to extend the time interval of one or more obtained keyed elements. For example, an interval extender 142 may be configured to receive a second-time interval that precedes the first-time interval and may apply the composite key 140 against the data of log files 116 for the second-time interval.

In some implementations, it may occur that the second-time interval extends into a time period for which log data in log files 116 has been migrated or copied to archive 118. An archive selector 144 may be configured to determine when these types of extensions occur and to instruct interval extender 142 to apply the composite key 140 to archive 118 as well. As described in more detail below, it may be necessary to account for differences in formatting between log files 116 and archive 118 when the second-time interval includes intervals with data that has previously been archived.

A user, e.g., administrator, may thus execute an iterative group-and-filter search operation for a first time interval to identify one or more keyed elements suspected of being related to, or causing, a system malfunction or underperformance. The user may then extend the first time interval to include a preceding, second-time interval for each identified keyed element, all within a single online search session. As a result, the user is facilitated in identifying, and correcting, root cause problems in system performance.

Figure 2:
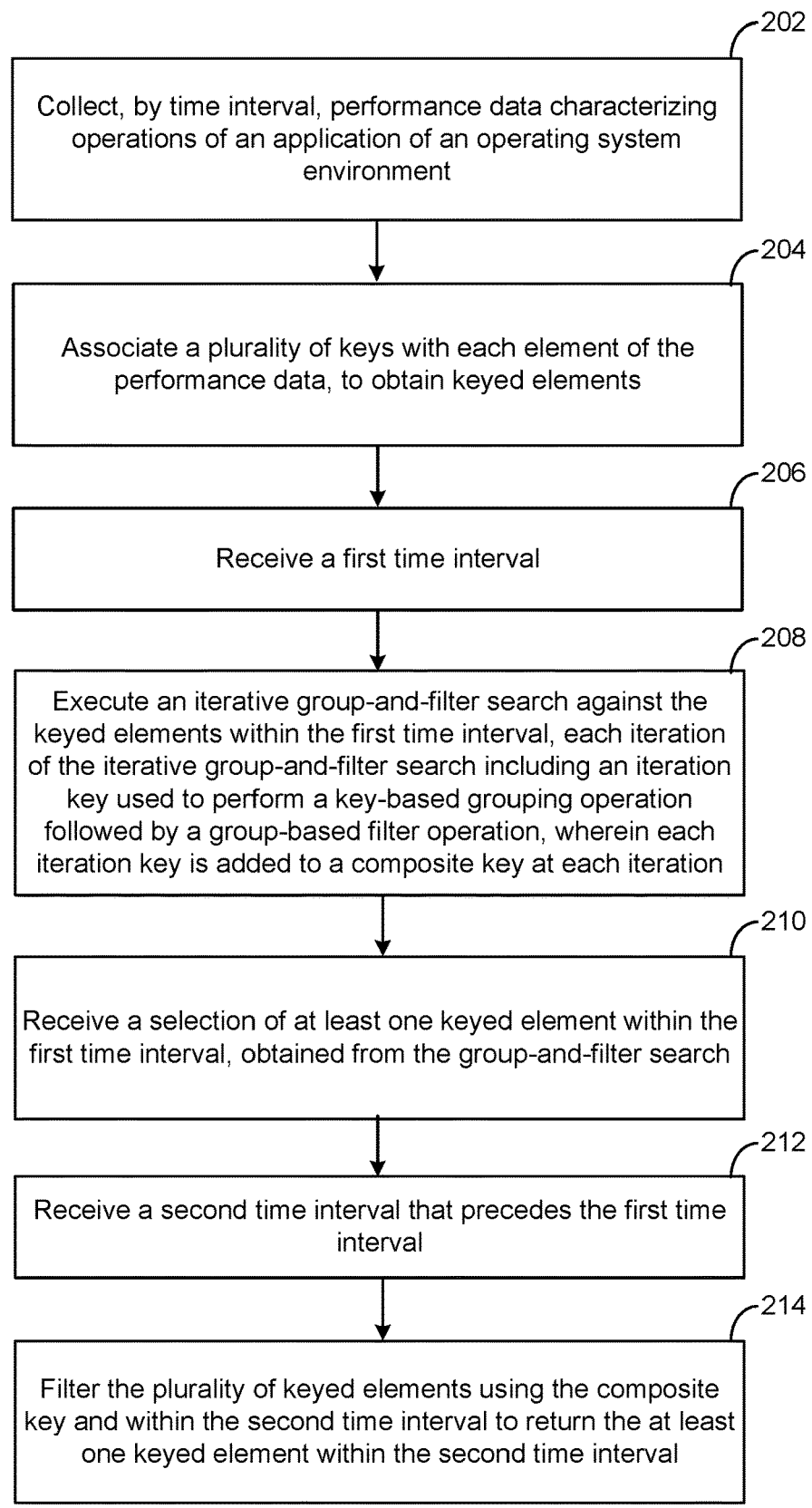
FIG. 2 is a flowchart illustrating example operations of the performance analysis system of FIG. 1.

FIG. 2 is a flowchart illustrating example operations of the performance analysis system of FIG. 1. In the example of FIG. 2, operations 202-214 are illustrated as separate, sequential operations. In various implementations, operations 202-214 may include sub-operations, may be performed in a different order, may include alternative or additional operations, or may omit one or more operations. Further, in all such implementations, included operations may be performed in an iterative, looped, nested, or branched fashion.

In the example of FIG. 2, performance data characterizing operations of an application of an operating system environment 102 may be collected, by time interval (202). For example, data collector 110 of FIG. 1 may collect performance data of application 104 or database application 106, or any application running in the OS environment 102. As described above, the time interval may be a discrete quantity of time defined by interval handler 120.

A plurality of keys may be associated with each element of the performance data to obtain keyed elements (204). For example, key handler 122 may be associated with each or all of a plurality of keys with each performance data element. In some cases, not all keys will apply to, or be associated with, all performance data elements. Although not illustrated separately in the example of FIG. 2, log generator 124 may be configured to store keyed elements within log files 116. Over time, archive handler 126 may be configured to migrate or copy individual log files to archive 118.

A first time interval may be received (206). For example, interval selector 128 of report generator 112 may receive a selection of a first time interval to be investigated. For example, if the time interval defined using interval hander 120 is a 5-minute time interval, then the selected first time interval may include, e.g., a current or most recent 5-minute interval, or a preceding 30-minute interval that includes 6 of the time intervals.

An iterative group-and-filter search may be executed against the keyed elements within the first time interval, each iteration of the iterative group-and-filter search including an iteration key used to perform a key-based grouping operation followed by a group-based filter operation, wherein each iteration key is added to a composite key at each iteration (208). For example, group handler 130 and group filter 132 may be configured to iteratively receive selections of iteration keys and iteration key values, respectively, at each iteration of the iterative group-and-filter search. Also, at each iteration, composite key handler 136 of trend analyzer 114 may be configured to add each iteration key and iteration key value to the composite key 140, and iteratively update the data structure storing the composite key 140, e.g., a composite key control block.

A selection may be received of at least one keyed element within the first time interval, obtained from the iterative group-and-filter search (210). For example, interval extender 142 of trend analyzer 114 may receive the selection of a particular performance data element that was identified by the iterative group-and-filter search.

A second time interval that precedes the first time interval may be received (212). For example, interval extender 142 of trend analyzer 114 may receive a second time interval. For example, if the time interval of data collection is 5 minutes, and the first selected time interval is 30 minutes, the second selected time interval may include the 60 minutes preceding the first selected time interval.

The second selected time period may be any configurable value that may be applied against the stored performance elements. For example, if the first selected time interval is 30 minutes, the second selected time interval may be defined with respect to various other temporal parameters, such as the start of a business day.

The plurality of keyed elements may be filtered using the composite key and within the second time interval to return the at least one keyed element within the second time interval (214). For example, interval extender 142 may apply the composite key 140 as stored within composite key control block 140, and including all of the iteration keys and iteration key values, together with the second selected time interval, as filters against log files 116 (or, if necessary against archive 118). This approach quickly returns the same keyed element(s) that resulted from the iterative group-and-filter search, but extended to provide values thereof that existed during the second time interval.

FIGS. 3-10 are graphs illustrating an example operation of the performance analysis system of FIG. 1. In the graphs of FIGS. 3-10, illustrated grids each represent all performance data available for analysis. As illustrated in grid 302 of FIG. 3, the x-axis represents selected time intervals determined using interval handler 120, while the y-axis represents individual performance elements, which have been associated with (and may be generated and identified using) various keys and key values, as already described.

Figure 4:
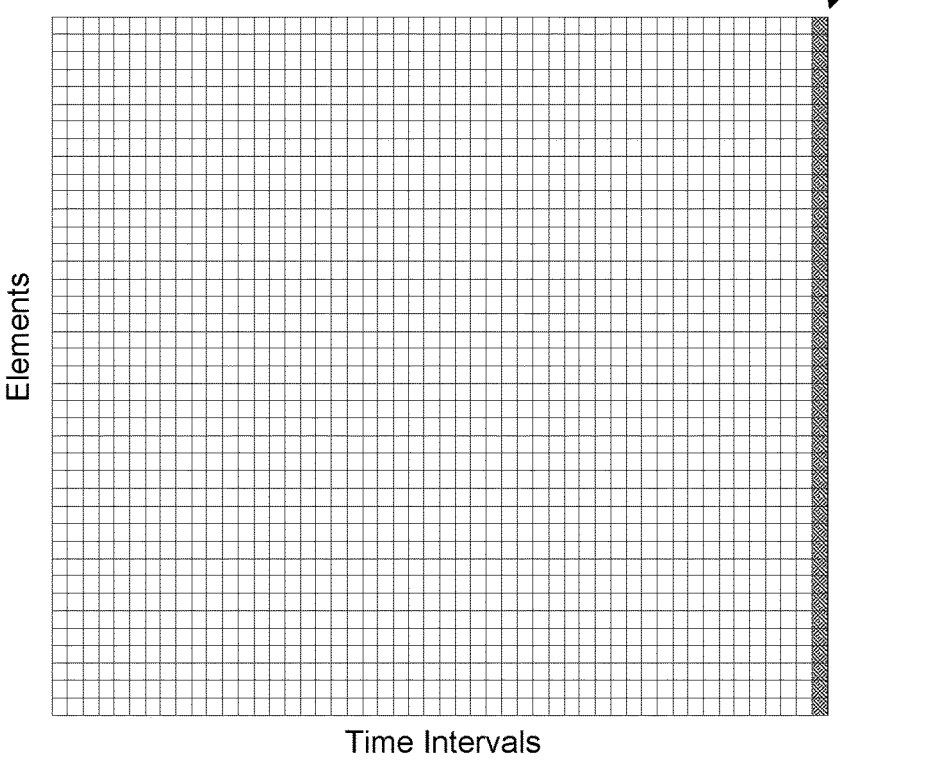

In FIG. 4, column 402 thus represents a selection of a corresponding time interval as the first time interval, to be used in the type of iterative group-and-filter search already described. In the example, selection of column 402 represents selection of a most-recent time interval as the selected first time interval, but more than one time interval of the x-axis may be chosen. With no specific key having yet been identified or selected for grouping purposes, column 402 includes all available elements within the selected first time interval. Nonetheless, the various elements may be grouped by key, using group handler 130.

For example, FIG. 4 may have keyed elements grouped by the key "user," and group handler 130 may group all elements by the key "user." In some implementations, group handler 130 may also rank the resulting, grouped elements according to various criteria that have been determined to be associated with potential problems (e.g., CPU or memory usage metrics).

Further in the example, it is assumed that values of the elements of column 402 are determined to be indicative of a problem within operations of the performance analysis system of FIG. 1. Therefore, in FIG. 5, the administrator is assumed to have looked at the accumulated values of the keyed elements of FIG. 4, and to have determined that the group for a representative Key 1, with value=A, is likely to contain the source of an identified problem. For example, a particular user having a unique user ID may be identified (where a user may be an individual or a group). The result in FIG. 5 is that using group filter 132, remaining elements 502 are obtained from filtering all other values (e.g., user IDs) for the key "user."

Accordingly, a first iteration of the iterative group-and-filter search operation is completed, at which point the corresponding iteration key, which is the key "user" with value A in the example, may be stored by composite key handler 136 within a corresponding composite key being constructed.

Figure 5:
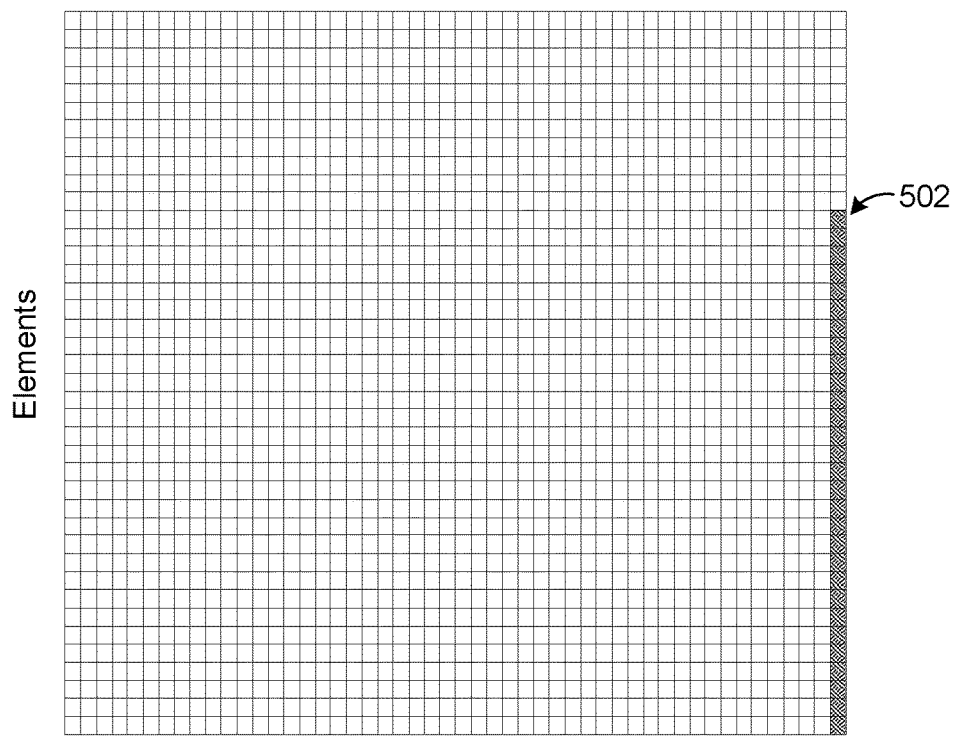

The example with the performance data elements of FIG. 5 is grouped and aggregated by a second received key, referred to simply as Key 2. Although not discernable in the simplified example of FIG. 5, the resulting grouping may include displaying the relevant groups by name, ranking, or sorting the groups based on some specified, included values and aggregating any included values, as needed.

Figure 6:
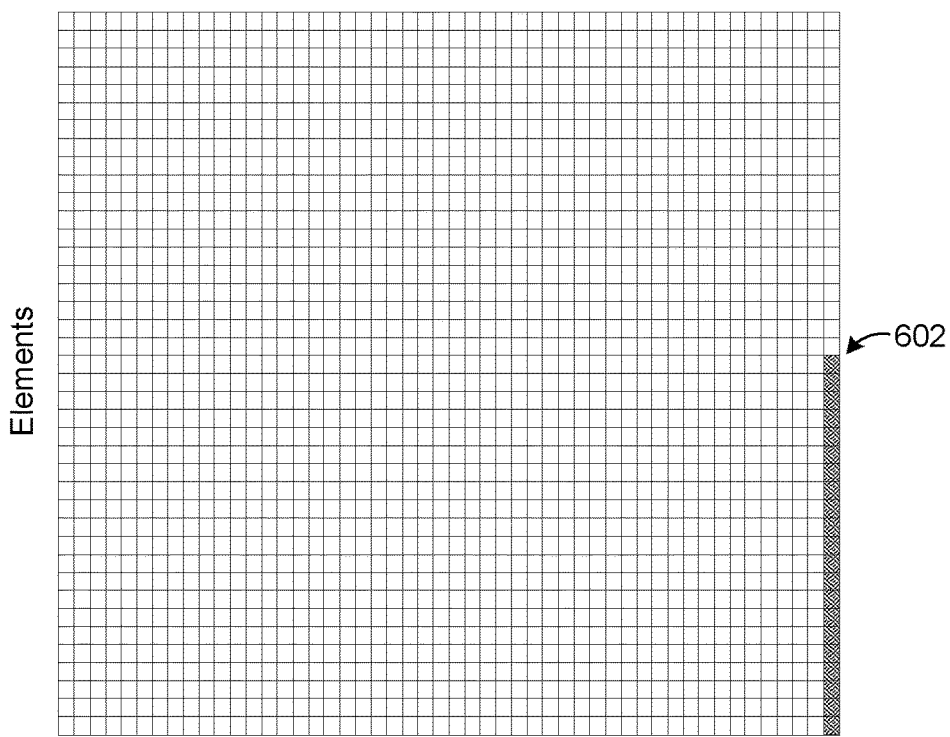

From the resulting groups, a value of Key 2=B, e.g., a specific group of the groups, may be received, followed by a filtering operation of remaining groups, to arrive at the performance data elements 602 of FIG. 6. That is, elements 602 represent a narrowed set of performance data elements, having Key 1=A and Key 2=B. As with FIG. 5, Key 2 represents an iteration key that may be added with its relevant value B to the composite key being assembled.

Figure 7:
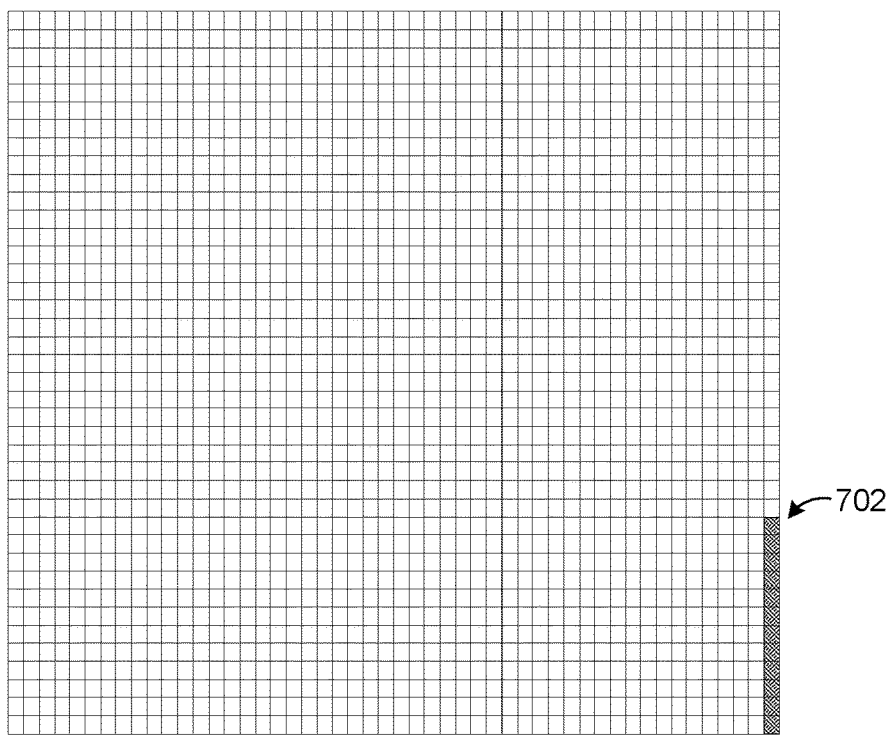

The process continues in FIG. 7 with selection of a new Key 3, grouping (and any associated ranking/sorting/processing) based thereon, and selection of a new key value C to be applied as a filter to the grouping to obtain remaining performance data elements 702. Thus, elements 702 represent a narrowed set of performance data elements, having Key 1=A, Key 2=B, and Key 3=C. As with FIGS. 5 and 6, Key 3 represents an iteration key that may be added with its relevant value C to the composite key being assembled.

Figure 8:
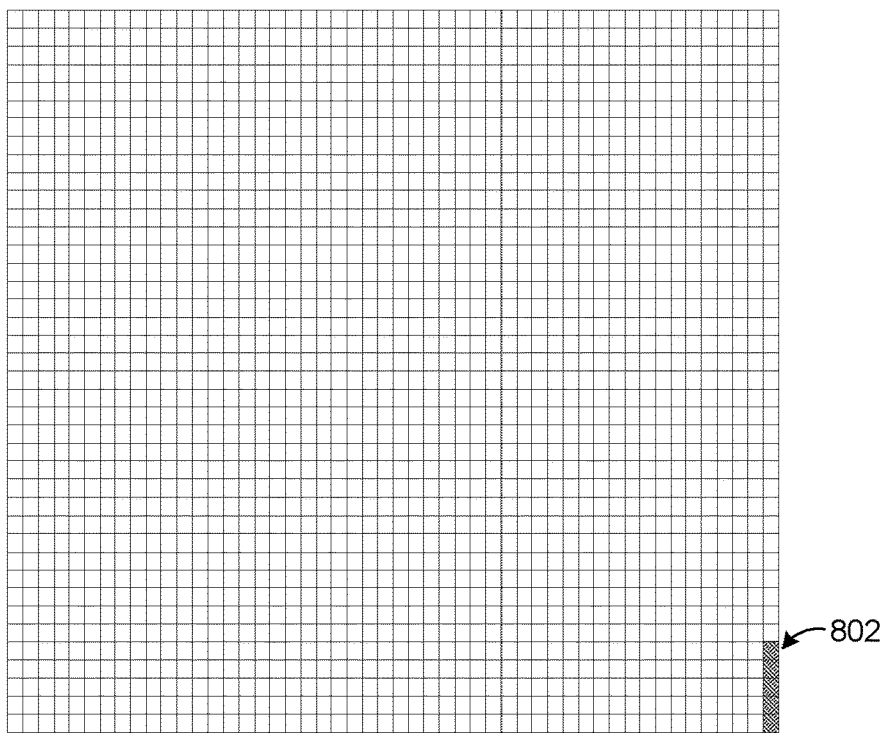
Figure 9:
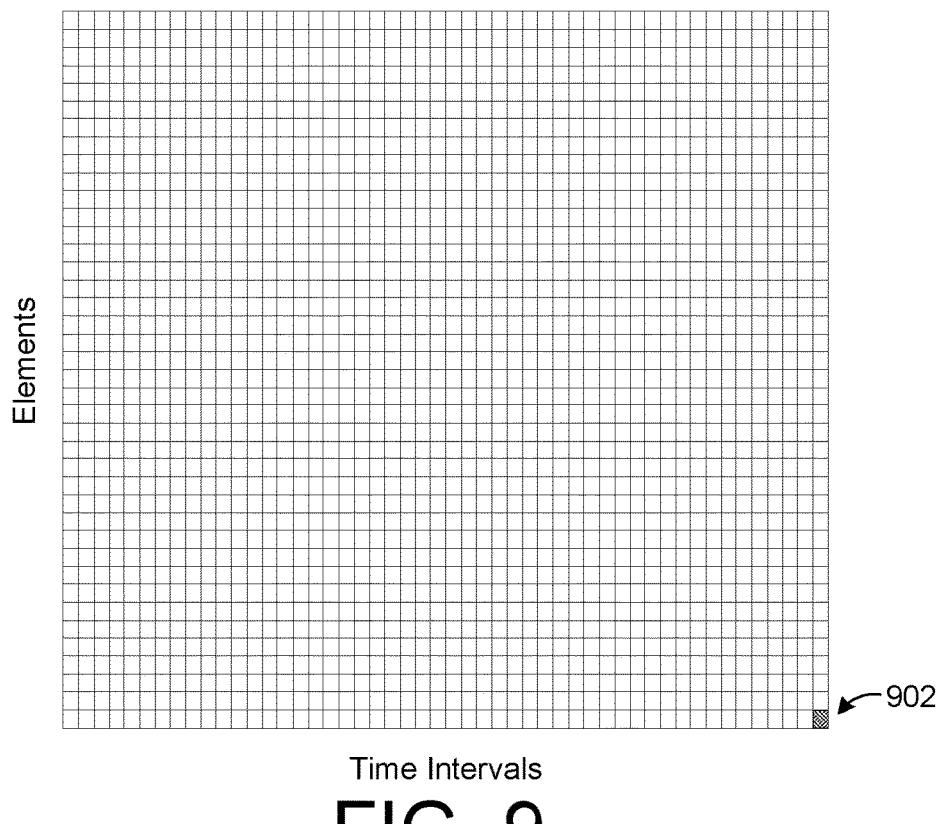

The process continues in FIG. 8 with selection of a new Key 4, grouping (and any associated ranking/sorting/processing) based thereon, and selection of a new key value D to be applied as a filter to the grouping to obtain remaining performance data elements 802. Thus, elements 802 represent a further narrowed set of performance data elements, having Key 1=A, Key 2=B, Key 3=C, and Key 4=D. As with FIGS. 5-7, Key 4 represents an iteration key that may be added with its relevant value D to the composite key being assembled.

In the example, the above process is repeated on more time, with selection of a new Key 5, grouping (and any associated ranking/sorting/processing) based thereon, and selection of a new key value E to be applied as a filter to the grouping to obtain a single remaining performance data element 902. Thus, element 902 represents a fully narrowed set of performance data elements, having Key 1=A, Key 2=B, Key 3=C, Key 4=D, and Key 5=E. As with FIGS. 5-8, Key 5 represents an iteration key that may be added with its relevant value E to the composite key being assembled.

Identified element 902 within the first time interval represents a particular performance data element, within a particular context that is defined by the composite key, that identifies a potential source of a malfunction or underperformance within the performance analysis system of FIG. 1, e.g., with respect to operations of database application 106. For example, as referenced above and as described in detail in the following examples of FIGS. 12-23, element 902 may represent a particular query. The query may be a complex, long-running query, which may be consuming an undesirable quantity of computing resources (e.g., CPU, or memory resources). Such consumption may be permitted and expected, may be the result of an ill-formed query, or may be associated with some other hardware or software malfunction.

Figure 3:
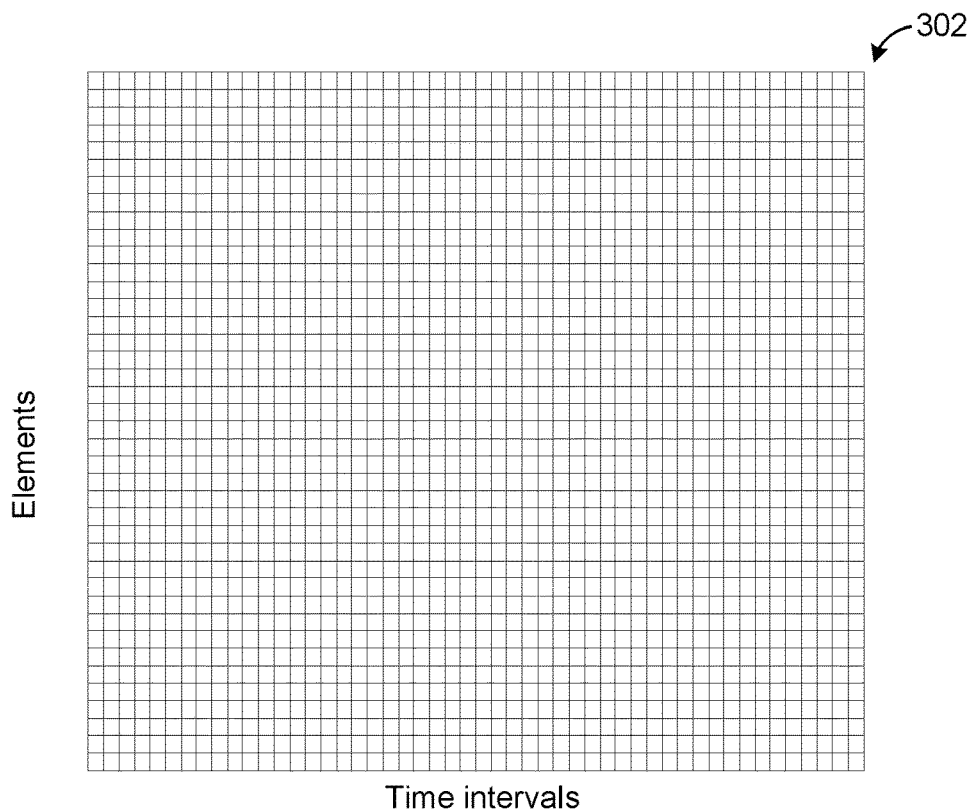
FIGS. 3-10 are graphs illustrating an example operation of the performance analysis system of FIG. 1.

Considering original grid 302 of FIG. 3, element 902 may be understood to represent, e.g., a single query out of a large number of queries. A problem related to such a query may have many direct and indirect effects, and yet the problematic query may be difficult to find. The iterative group-and-filter search operation of FIGS. 3-9 effectively provides a path to progressively zoom in on, and otherwise locate and identify, element 902 within the first time interval, in an efficient manner.

As also discussed, identifying element 902 within a first time interval only serves to identify a potential problem source. It is possible that any apparently anomalous values of element 902 may in fact be normal values, when considered as part of a larger trend over a longer period of time and within the same context of the composite key.

To determine whether element 902 within the first time interval represents an actual or apparent problem source, it is possible to begin again with grid 302 of FIG. 3, select an entirety of available time intervals of the x-axis, and repeat the iterative group-and-filter search operation. This approach, however, requires processing all of the various performance data elements during multiple iterations, which is highly resource-intensive. Moreover, if a user is expected to remember each iteration key and associated key value, an undue burden is placed on the user, and may lead to inconvenience and wasted time at best, or erroneous results at worst.

Figure 10:
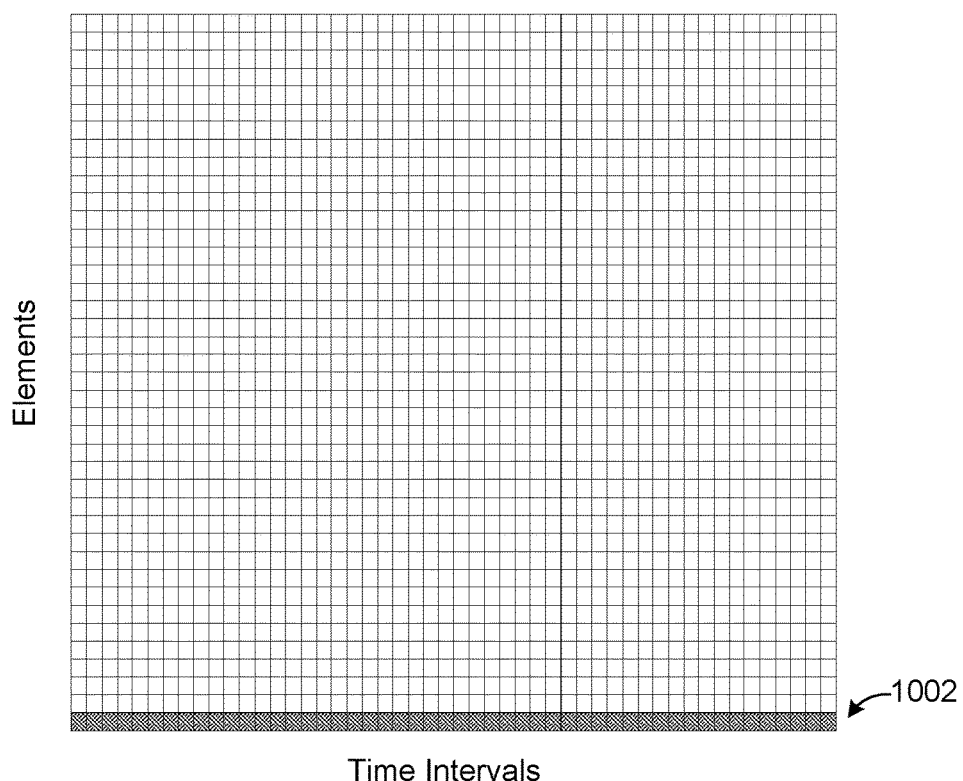

In contrast, as described with respect to FIG. 1, trend analyzer 114 may be configured to extend the time interval of element 902 to multiple other elements having the same context thereof, i.e., being associated with the same composite key and associated key values. Therefore, as shown in FIG. 10, it is possible to broaden the interval of analysis while maintaining all existing key filters, to obtain a performance data element 1002 within a second time interval. In the example of FIG. 10, the second time interval includes an entirety of the illustrated time intervals of the x-axis, but could include any selected portion thereof.

Figure 11:
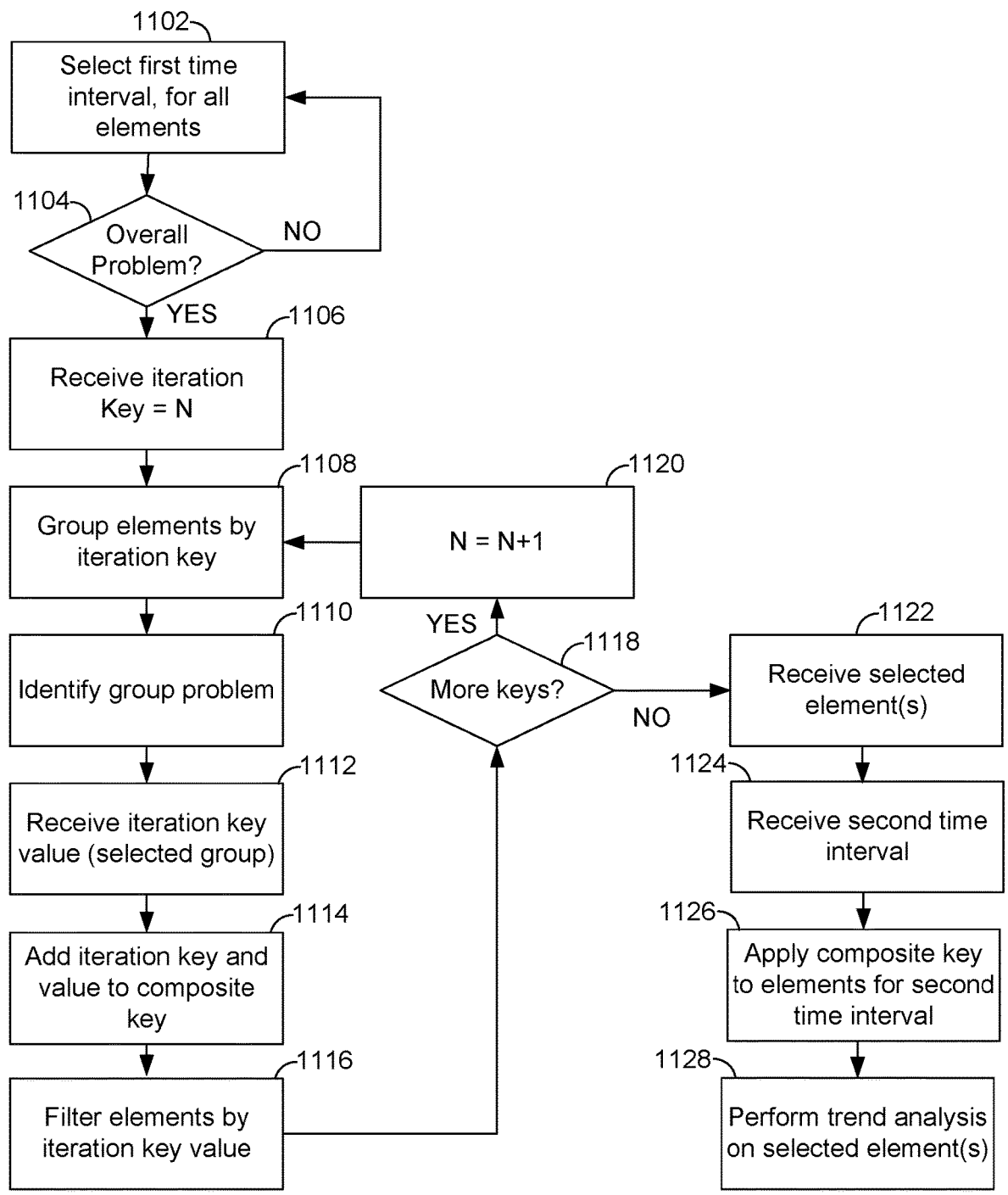
FIG. 11 is a flowchart illustrating a more detailed example of the flowchart of FIG. 2.

FIG. 11 is a flowchart illustrating a more detailed example of the flowchart of FIG. 2, and corresponding to the example of FIGS. 3-10 and FIGS. 12-23. In the example of FIG. 11, a first time interval is selected for application to all available elements (1102). For example, a start time may be provided, and the first time interval may include all discrete intervals of data collection between the start time and most-recent data.

If an overall problem is identified within the collected elements (1104), such as excessive CPU consumption or other problematic metric, then a group-and-filter search operation may be initiated by selection of a first iteration key=N (1106). Then, the elements may be grouped according to the first iteration key (1108). That is, the elements may be grouped into different groups, each group having a different iteration key value for the selected iteration key.

A group problem may then be identified (1110). For example, the groups may be ranked or sorted based on various criteria, such as CPU consumption. Accordingly, it may be straightforward for a user to identify a group as being likely to include a contributor to the identified problem.

Then, an iteration key value may be received (1112). That is, a group may be selected from among the displayed groups. The current iteration key and iteration key value may be added to the composite key (1114).

As referenced above, the composite key may be stored using any suitable data structure. For example, similar to FIG. 1, a control block in z/OS programming contexts may be used to provide a defined mapping in memory that includes slots corresponding to the available plurality of keys. As a user executes iterations, accumulating iteration keys and iteration key values, these iteration keys and iteration key values may be added into a corresponding slot in memory corresponding to that key, as mapped by the data structure. Thus, upon executing this type of placement, the data structure contains the iteration key value in the appropriate iteration key slot for each iteration key, to thereby represent the composite key.

The grouped elements may then be filtered based on the selected iteration key value (1116). That is, all groups having a key value different from the iteration key value may be removed.

If more keys are available (1118), then the process may continue with selection of a next iteration key N=N+1 (1120). If no more keys are available, or added (1118), then one or more remaining, displayed element(s) may be likely to include a source of the original problem, and a selection thereof may be received for further investigation (1122).

A second time interval may be received (1124). For example, a time preceding the originally-identified start time may be received. The second time interval may precede and include the first time interval. The second time interval may precede the first time interval by as little as the unit of time interval collection, or as much time (data) as is available for selection.

The stored composite key may then be applied to all of the elements and second time interval (1126). That is, the collected iteration keys and iteration key values may be used to filter the available elements. For example, the above-referenced data structure (e.g., control block) may be applied.

As referenced above, in some cases, the second time interval may extend into a time period for which associated data has been archived in archive 118 and may or may not be available within log files 116. In general, access to specific data in log files 116 is very efficient and may use, e.g., a key structure for log file retrieval that is largely compatible with the composite key data structure (e.g., control block) described above. Archive 118, however, may be included as sequential files that utilize a sequential scan to locate matching data, which is generally a much slower operation. In some implementations, therefore, a user may be explicitly asked whether archive 118 should be included in the interval extension.

Additionally, some records may be duplicated between log files 116 and archive 118. For example, archive 118 may be created while the data is still in log files 116, and before that data is overwritten by later activity. At any point in time, therefore, there may be some overlap such that a record may be read from archive 118, even though that record still exists in log files 116. Duplicate detection logic may be added to eliminate duplications from such scenarios, and to avoid over-reporting activity for a record existing in both sources.

Finally, in FIG. 11, trend analysis may be performed on selected element(s) (1128). For example, an administrator may compare different values of the selected elements over the first time interval and the second time interval. The administrator may extend the second time interval by adding a third time interval that precedes the second time interval. The administrator may also easily select a second element that was previously identified (1122) and extend performance data for the second element to the second time interval. In some implementations, extension of multiple identified elements may proceed individually, while in other implementations, the multiple identified elements may be extended to a second- or third-time interval together.

FIGS. 12-23 are screenshots illustrating an example implementation of the system of FIG. 1, using the methods of the flowcharts of FIGS. 2 and 11. In the examples of FIGS. 12-23, the above-referenced interval expansion is described in the context of a TREND command for Db2.

In the example, a large volume of Db2 performance data is captured at the level of individual Standard Query Language (SQL) statements, so that any performance issues at the SQL statement level may be identified and addressed. The types of group-and-filter search operation described above allows for navigation to the SQL statement level through a variety of paths, with each step providing a zoom into lower levels of data. For example, from a report showing performance data at the Db2 server (Logical Db2 or data sharing group) level, the user can zoom to a plan level, program level, user level, correlation identification level, or other level(s), all of which represent different ways of grouping the SQL activity in Db2.

In FIG. 12, a report criteria section 1202 of FIG. 12 enables selection of report criteria that includes a start time 1206 (e.g., midnight of a particular, current date), while an option selector section 1204 enables a type of report to be generated (e.g., a workload analysis). In the example, a user starts at the logical Db2 server level.

In FIG. 13, a key or zoom section 1302 includes selectable keys corresponding to the various groups referenced above. A report section 1304 provides an initial report, with all logical Db2 servers listed and ranked by various criteria, including % CPU consumption. The logical Db2 "DEJM" may be seen to be consuming the most CPU resources.

Then, the key P=plan level 1308 may be selected to get a report of consumption by plan. In FIG. 14, upon being presented with performance numbers by plan in report section 1404, it is seen that plan "ACT1211M" 1404 is the highest CPU consumer. Then, the key R=program 1406 is selected to see the list of programs under the plan 1404. FIG. 14 also illustrates that the composite key 1408 may be displayed (e.g., showing here that for Db2, group=DEJM). As illustrated in remaining FIGS. 15-18 and 20-22, the composite key 1408, in conjunction with being maintained and updated in memory, may also be consistently maintained, updated, and displayed with a corresponding GUI.

In FIG. 15, composite key 1408 is updated to reflect the selection of the plan 1404 from FIG. 14. Report section 1502 shows that the highest-consuming program under the plan is ACSGSQL 1504. User key "U" 1506 is selected to see which users are running the program ACSGSQP 1504, with corresponding consumption per user, as shown in FIG. 16.

Figure 16:
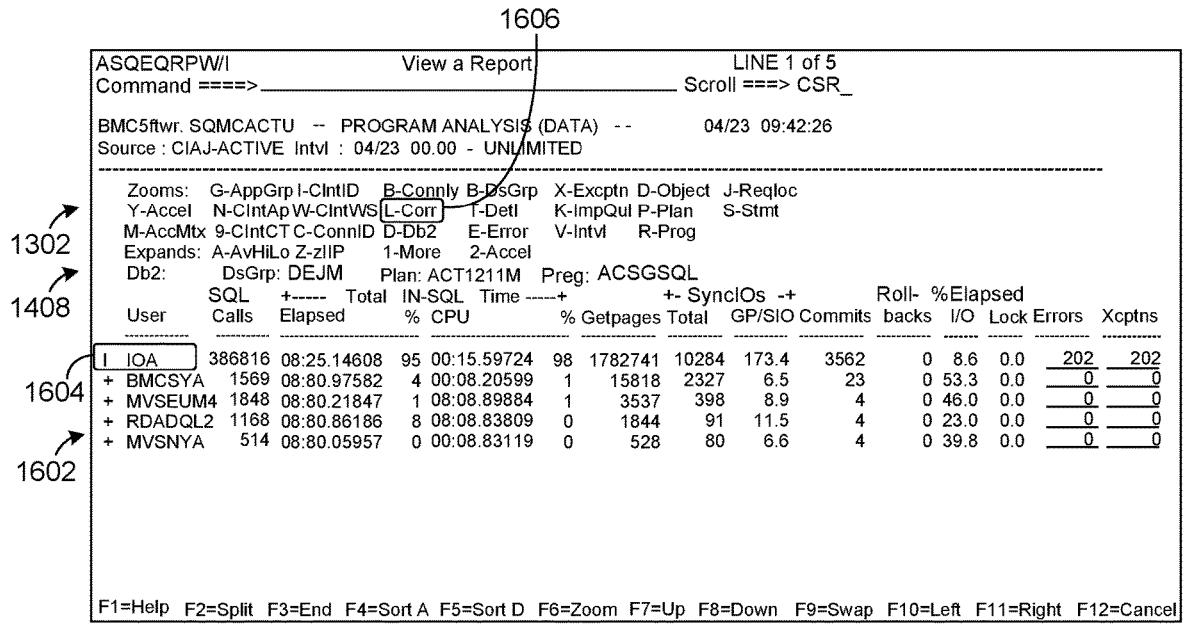
Figure 17:
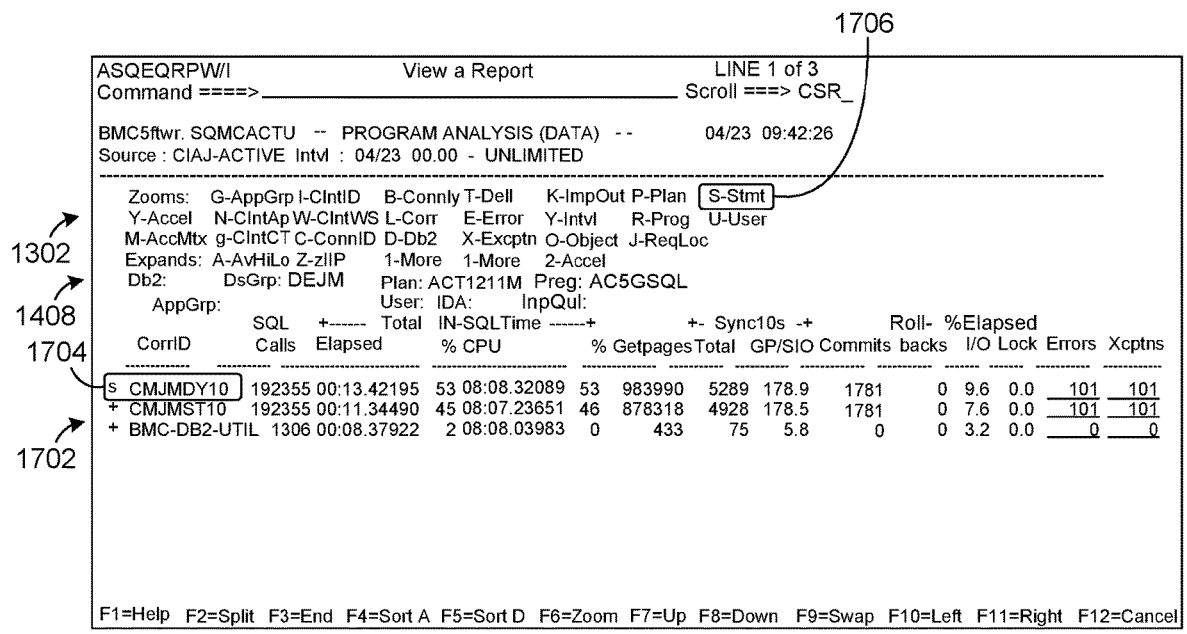

Specifically, in reportion section 1602 of FIG. 16, for the highest-consuming user "IOA" 1604, key value L=Correlation 1606 may be selected to see which correlation ids (e.g., z/OS batch jobnames) are the highest consumers. Then, in FIG. 17, reportion section 1702 shows that a correlation id CMJMDY10 1704 is the highest consuming correlation id. A key S=statement 1706 is selected to view performance at the SQL statement level.

In FIG. 18, report section 1802 shows that a cursor 1804 represented by statement number 712 is the highest-consuming statement. From here a key S=SQLtxt 1806 may be selected to see, as shown in FIG. 19, the SQL text and various other details 1902. Composite key 1408 is displayed and updated at each of FIGS. 15-18.

As described above, a helpful question when assessing SQL statement performance behavior includes whether the statement had been behaving in the same way recently, e.g., over the past several days. Without the techniques described herein, to answer that question, the user would be forced to back up to the starting point of FIG. 12, change the interval to include several preceding days instead of the current day, and then remember to take the same navigation of FIGS. 12-19, e.g., Db2=DEJM, Plan=ACT1211M, Program=ACSGSQL, User=IOA, Correlation ID=CMJMDY10, Cursor for statement 712.

Such approaches are time-consuming and error-prone, particularly when performed for each SQL statement under consideration. In addition, for analysis purposes it is useful to go back further in time. However, to start at the highest level with a considerably longer history requires much more data to sift through at each step of the path. The data may be stored in an indexed set of logs for quick online retrieval, and, when desirable to go further back in time, using sequential, non-indexed archive files, as described herein.

As shown in FIG. 20, however, instead of backing up and re-navigating the path, a key "V"=Intvl 2002 may be selected to see activity by interval. Then, as shown in FIG. 21, report section 2102 illustrates a current workload interval a command 2104 for "TREND 30 ARCHIVES" may be issued to see the last 30 days' worth of activity, as illustrated in FIG. 22 within report section 2202. Composite key 1408 is displayed for reference at each of FIGS. 20-22. The example of FIG. 22 shows that CPU consumption of the statement in question is somewhat consistent.

In the additional example of FIG. 23, a report section 2302 for a different composite key 2304 is shown. The history only goes back one day, but a sharp increase in CPU consumption is seen moving from one day to the next (e.g., from 2% to 95%). In this case, the report is expanded to show the average/high/low CPU consumptions for the statement in question, and it is quickly seen that 91% of the total CPU consumed by this statement is in the most recent interval, and that the average consumption is sharply higher. Thus, the user is provided with an ability to get to this point very quickly, without backing up in the navigation, changing the interval range, and re-navigating to the same report.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
    collect, over a time period, performance data including performance elements characterizing operations of an application of an operating system environment;
    associate a plurality of keys with each performance element, to obtain keyed performance elements;
    receive a first time interval within the time period;
    execute an iterative group-and-filter search against the keyed performance elements within the first time interval, including:
        (a) performing a key-based grouping operation using an iteration key of the plurality of keys,
        (b) adding the iteration key to a composite key,
        (c) performing a group-based filter operation to identify a narrowed set of keyed performance elements associated with a problem in the performance data of the application, and
        (d) repeating operations (a)-(c) until a final iteration is reached, the final iteration including at least one keyed performance element of the narrowed set of keyed elements of the final iteration;
    receive a second time interval that precedes the first time interval within the time period;
    filter the keyed performance elements using the composite key and within the second time interval to return the at least one keyed performance element within the second time interval; and
    identify the problem within the second time interval, based on the at least one keyed performance element within the second time interval.

2. The computer program product of claim 1, wherein the group-based filter operation is conducted using an iteration key value of the iteration key, and the iteration key value is added to the composite key.

3. The computer program product of claim 2, wherein the instructions, when executed by the at least one computing device, are further configured to cause the at least one computing device to:
    display the composite key at each iteration of the iterative group-and-filter search, including each iteration key and iteration key value determined in preceding iterations.

4. The computer program product of claim 1, wherein the instructions, when executed by the at least one computing device, are further configured to cause the at least one computing device to execute an iteration of the iterative group-and-filter search including causing the at least one computing device to:
    execute the key-based grouping operation, wherein the key-based grouping operation is defined with respect to a current iteration key of the plurality of keys and the key-based grouping operation produces key-based groups;
display the key-based groups within the first time interval and sorted by performance data included in each of the key-based groups;
receive a selected group of the key-based groups, the selected group representing a current iteration key value for the current iteration key;
execute the group-based filter operation to filter non-selected ones of the key-based groups, using the current iteration key value; and
add the current iteration key and the current iteration key value to the composite key.

5. The computer program product of claim 1, wherein the performance data is stored by interval and aggregated over each interval within log files.

6. The computer program product of claim 5, wherein the log files are stored in an archive as sequential files after archive criteria are met.

7. The computer program product of claim 6, wherein the instructions, when executed by the at least one computing device, are further configured to cause the at least one computing device to:
determine that the second time interval requires performance data from the archive; and
apply the composite key and the second time interval to the archive to return the at least one keyed element.

8. The computer program product of claim 1, wherein the instructions, when executed by the at least one computing device, are further configured to cause the at least one computing device to:
store the composite key using a data structure with a defined mapping that includes slots corresponding to the plurality of keys, in which an iteration key value is added into a corresponding slot for a corresponding iteration key at each iteration.

9. The computer program product of claim 1, wherein the instructions, when executed by the at least one computing device, are further configured to cause the at least one computing device to:
receive a selection of at least a second keyed element within the first time interval, obtained from the iterative group-and-filter search;
receive a third time interval that precedes the first time interval; and
filter the keyed elements using the composite key and within the third time interval to return the at least the second keyed element within the third time interval.

10. A computer-implemented method, the method comprising:
collecting, over a time period, performance data including performance elements characterizing operations of an application of an operating system environment;
associating a plurality of keys with each performance element to obtain keyed performance elements;
receiving a first time interval within the time period;
executing an iterative group-and-filter search against the keyed performance elements within the first time interval, including:
(a) performing a key-based grouping operation using an iteration key of the plurality of keys,
(b) adding the iteration key to a composite key,
(c) performing a group-based filter operation to identify a narrowed set of keyed performance elements associated with a problem in the performance data of the application, and
(d) repeating operations (a)-(c) until a final iteration is reached, the final iteration including at least one keyed performance element of the narrowed set of keyed elements of the final iteration;
receiving a second time interval that precedes the first time interval within the time period;
filtering the keyed performance elements using the composite key and within the second time interval to return the at least one keyed performance element within the second time interval; and
identifying the problem within the second time interval, based on the at least one keyed performance element within the second time interval.

11. The method of claim 10, wherein the group-based filter operation is conducted using an iteration key value of the iteration key, and the iteration key value is added to the composite key.

12. The method of claim 11, further comprising:
displaying the composite key at each iteration of the iterative group-and-filter search, including each iteration key and iteration key value determined in preceding iterations.

13. The method of claim 10, wherein an iteration of the iterative group-and-filter search includes:
executing the key-based grouping operation, wherein the key-based grouping operation is defined with respect to a current iteration key of the plurality of keys and the key-based grouping operation produces key-based groups;
displaying the key-based groups within the first time interval and sorted by performance data included in each of the key-based groups;
receiving a selected group of the key-based groups, the selected group representing a current iteration key value for the current iteration key;
executing the group-based filter operation to filter non-selected ones of the key-based groups, using the current iteration key value; and
adding the current iteration key and the current iteration key value to the composite key.

14. The method of claim 10, comprising:
storing the composite key using a data structure with a defined mapping that includes slots corresponding to the plurality of keys, in which an iteration key value is added into a corresponding slot for a corresponding iteration key at each iteration.

15. The method of claim 10, further comprising:
receiving a selection of at least a second keyed element within the first time interval, obtained from the iterative group-and-filter search;
receiving a third time interval that precedes the first time interval; and
filtering the keyed elements using the composite key and within the third time interval to return the at least the second keyed element within the third time interval.

16. A system comprising:
at least one memory including instructions; and
at least one processor that is operably coupled to the at least one memory and that is arranged and configured to execute instructions that, when executed, cause the at least one processor to
collect, over a time period, performance data including performance elements characterizing operations of an application of an operating system environment;
associate a plurality of keys with each performance element to obtain keyed performance elements;
receive a first time interval within the time period;

execute an iterative group-and-filter search against the keyed performance elements within the first time interval, including:
- (a) performing a key-based grouping operation using an iteration key of the plurality of keys,
- (b) adding the iteration key to a composite key,
- (c) performing a group-based filter operation to identify a narrowed set of keyed performance elements associated with a problem in the performance data of the application, and
- (d) repeating operations (a)-(c) until a final iteration is reached, the final iteration including at least one keyed performance element of the narrowed set of keyed elements of the final iteration;

receive a second time interval that precedes the first time interval within the time period;

filter the keyed performance elements using the composite key and within the second time interval to return the at least one keyed performance element within the second time interval; and identify the problem within the second time interval, based on the at least one keyed performance element within the second time interval.

17. The system of claim 16, wherein the group-based filter operation is conducted using an iteration key value of the iteration key, and the iteration key value is added to the composite key, and wherein the instructions, when executed, are further configured to cause the at least one processor to:

display the composite key at each iteration of the iterative group-and-filter search, including each iteration key and iteration key value determined in preceding iterations.

18. The system of claim 16, wherein the instructions, when executed, are further configured to cause the at least one processor to:

execute the key-based grouping operation, wherein the key-based grouping operation is defined with respect to a current iteration key of the plurality of keys and the key-based grouping operation produces key-based groups;

display the key-based groups within the first time interval and sorted by performance data included in each of the key-based groups;

receive a selected group of the key-based groups, the selected group representing a current iteration key value for the current iteration key;

execute the group-based filter operation to filter non-selected ones of the key-based groups, using the current iteration key value; and add the current iteration key and the current iteration key value to the composite key.

19. The system of claim 16, wherein the instructions, when executed, are further configured to cause the at least one processor to:

store the composite key using a data structure with a defined mapping that includes slots corresponding to the plurality of keys, in which an iteration key value is added into a corresponding slot for a corresponding iteration key at each iteration.

20. The system of claim 16, wherein the instructions, when executed, are further configured to cause the at least one processor to:

receive a selection of at least a second keyed element within the first time interval, obtained from the iterative group-and-filter search;

receive a third time interval that precedes the first time interval; and filter the keyed elements using the composite key and within the third time interval to return the at least the second keyed element within the third time interval.

* * * * *